(12) United States Patent
Cooper

(10) Patent No.: US 12,705,623 B2
(45) Date of Patent: Aug. 11, 2026

(54) MACHINE LEARNING SYSTEM

(71) Applicant: FEATURESPACE LIMITED, Cambridge (GB)

(72) Inventor: Simon Cooper, Cambridge (GB)

(73) Assignee: Featurespace Limited, Cambridge (GB)

( * ) Notice: Subject to any disclaimer, the term of this patent is extended or adjusted under 35 U.S.C. 154(b) by 0 days.

(21) Appl. No.: 17/919,091

(22) PCT Filed: Jul. 29, 2022

(86) PCT No.: PCT/IB2022/057080
§ 371 (c)(1),
(2) Date: Oct. 14, 2022

(87) PCT Pub. No.: WO2024/023573
PCT Pub. Date: Feb. 1, 2024

(65) Prior Publication Data
US 2024/0220988 A1 Jul. 4, 2024

(51) Int. Cl.
*G06Q 40/00* (2023.01)
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS 8,965,861 B1 2/2015 Shalla
10,699,190 B1 6/2020 Rotem et al.
(Continued)

FOREIGN PATENT DOCUMENTS

CN 111177250 A 5/2020
CN 113590637 A 11/2021
(Continued)

OTHER PUBLICATIONS

Branco Bernardo Bernardo Branco@Feedzai Com et al: "Interleaved Sequence RNNs for Fraud Detection", Proceedings of the 26th ACM SIGKDD International Conference on Knowledge Discovery & Data Mining, Aug. 23, 2020, pp. 3101-3109, XP058463052, DOI: 10.1145/3394486.3403361, ISBN: 978-1-4503-7998-4 (Year: 2020).*

(Continued)

*Primary Examiner* — Mark H Gaw
(74) *Attorney, Agent, or Firm* — King & Spalding LLP

(57) ABSTRACT

A machine learning system for processing incoming event data associated with a transaction. A state delta generator retrieves a version of the state data from a database and receives incoming event data. The generator processes the event data and the state data using a model to generate a state delta comprising a set of pending updates to the state data which is stored in a queue. An updater retrieves the event state deltas from the queue and the state data from the database. The updater applies the pending updates from each state delta to generate updated state data used to update the database. A cache stores a copy of each of the state deltas, where the copies of the state deltas are stored in the cache together with a value indicative of the version of the state data used to generate the state delta.

30 Claims, 11 Drawing Sheets

(56) References Cited

U.S. PATENT DOCUMENTS

| | | | | |
|---|---|---|---|---|
| 10,768,973 | B1 | 9/2020 | Jin | |
| 2007/0282810 | A1 | 12/2007 | Mueller | |
| 2010/0306179 | A1* | 12/2010 | Lim | G06F 11/3006 707/688 |
| 2011/0231524 | A1 | 9/2011 | Lin | |
| 2015/0081694 | A1 | 3/2015 | Friedlander et al. | |
| 2016/0103838 | A1 | 4/2016 | Sainani | |
| 2017/0192892 | A1 | 7/2017 | Pundir | |
| 2020/0159845 | A1 | 5/2020 | Xue | |
| 2020/0242265 | A1* | 7/2020 | Quinn | G06F 3/0673 |
| 2021/0103930 | A1* | 4/2021 | Fu | G06N 20/00 |
| 2021/0157643 | A1 | 5/2021 | Shear et al. | |
| 2021/0192524 | A1* | 6/2021 | Saleh | G06N 3/0442 |
| 2021/0248448 | A1 | 8/2021 | Branco | |
| 2021/0279280 | A1 | 9/2021 | Raghavendra et al. | |
| 2022/0164798 | A1 | 5/2022 | Yadav | |
| 2023/0152762 | A1 | 5/2023 | Ramanasankaran | |
| 2024/0020360 | A1* | 1/2024 | Owada | G06F 21/12 |

FOREIGN PATENT DOCUMENTS

| | | |
|---|---|---|
| DE | 102019110721 | 10/2020 |
| EP | 1879120 | 1/2008 |
| FR | 3090960 | 6/2020 |
| JP | 2025-216167 A | 8/2000 |
| JP | 2007272675 | 10/2017 |
| JP | 2018530817 | 9/2019 |

OTHER PUBLICATIONS

Sidelov, Pavlo (Anomaly Detection in Finance, SDK.finance, https://sdk.finance/blog/anomaly-detection-in-finance/ Apr. 21, 2021) (Year: 2021).*

International Search Report for PCT /IB2022/057080, issued Mar. 27, 2023.

Examination Report issued for European Patent Application No. 22706385.6, issued Jun. 1, 2023.

Branco Bernardo et al. “Interleaved Sequence RNNs for Fraud Detection”, Proceedings of the 26th ACM SIGKDD International Conference on Knowledge Discovery & Data Mining, ACMPUB27, New York, NY, USA, Aug. 23, 2020 (Aug. 23, 2020), pp. 3101-3109.

International Search Report for PCT/IB2021/060049, issued Aug. 12, 2022.

Pandey Kshitij et al: “A Review of Credit Card Fraud Detection Techniques,” 2021 5th Internation-al Conference on Computing Methodologies and Communication, Apr. 8, 2021, pp. 1645-1653.

Examination Report issued for European Patent Application No. 21810114.5, issued Jul. 3, 2023.

Summons to Attend Oral Proceedings for European Patent Application No. 21810114.5, issued Dec. 12, 2023.

International Search Report for PCT/IB2021/066049, issued Aug. 8, 2022.

Search Report for BG Patent Application No. GB 2211132.2 issued Dec. 12, 2022.

International Search Report for PCT /IB2022/050896, issued Sep. 30, 2022.

Prusti Debachudamani et al: “Credit Card Fraud Detection Technique by Applying Graph Database Model”, Arabian Journal for Science and Engineering, Springer Berlin Heidelberg, Berlin/Heidelberg, vol. 46, No. 9, May 4, 2021 (May 4, 2021), pp. 1-20.

English Translation of Office Action for Japanese Patent Application No. 2025-504789, mailed Jun. 23, 2026, 7 pgs.

* cited by examiner

240-A
242-A
240-B
242-B
240-N
242-N
232-A
232-B
232-N
230-A
230-B
230-N
Data Bus
220
210
200

240-A
242-A
240-B
242-B
240-N
242-N
280-A
280-B
280-N
Logical Storage Layer
270
260
210
250
202

MACHINE LEARNING SYSTEM

TECHNICAL FIELD

This invention relates to a machine learning system for and method of processing incoming event data, such as a machine learning system for detecting anomalies in patterns of data, e.g. for detecting fraudulent transactions, or a machine learning system for use in real-time transaction processing.

BACKGROUND

Digital payments have exploded over the last twenty years, with more than three-quarters of global payments using some form of payment card or electronic wallet. Point of sale systems are progressively becoming digital rather than cash based. Put simply, global systems of commerce are now heavily reliant on electronic data processing platforms. This presents many engineering challenges that are primarily hidden from a lay user. For example, digital transactions need to be completed in real-time, i.e. with a minimal level of delay experienced by computer devices at the point of purchase. Digital transactions also need to be secure and resistant to attack and exploitation. The processing of digital transactions is also constrained by the historic development of global electronic systems for payments. For example, much infrastructure is still configured around models that were designed for mainframe architectures in use over 50 years ago.

As digital transactions increase, new security risks also become apparent. Digital transactions present new opportunities for fraud and malicious activity. In 2015, it was estimated that 7% of digital transactions were fraudulent, and that figure has only increased with the transition of more economic activity online. Fraud losses are estimated to be four times the population of the world (e.g., in US dollars) and are growing.

Financial Services institutions are becoming subject to more regulatory scrutiny as traditional methods of fraud prevention, such as authentication of identity (e.g. passwords, digital biometrics, national ID, and the like) have proven to be ineffective at preventing fraud vectors such as synthetic identities and scams. These far more complicated threat vectors for fraud require significantly more analytics in a very short (sub 50 ms) time, and are often based on a much smaller data sampling size for the scam or fraud itself. This imposes significant technical challenges.

While risks like fraud are an economic issue for companies involved in commerce, the implementation of technical systems for processing transactions is an engineering challenge. Traditionally, banks, merchants and card issuers developed "paper" rules or procedures that were manually implemented by clerks to flag or block certain transactions. As transactions became digital, one approach to building technical systems for processing transactions has been to supply computer engineers with these sets of developed criteria and to ask the computer engineers to implement them using digital representations of the transactions, i.e. convert the hand-written rules into coded logic statements that may be applied to electronic transaction data. This traditional approach has run into several problems as digital transaction volumes have grown. First, any applied processing needs to take place at "real-time", e.g. with millisecond latencies. Second, many thousands of transactions need to be processed every second (e.g., a common "load" may be 1000-2000 per second), with load varying unexpectedly over time (e.g., a launch of a new product or a set of tickets can easily increase an average load level by several multiples). Third, the digital storage systems of transaction processors and banks are often siloed or partitioned for security reasons, yet digital transactions often involve an interconnected web of merchant systems. Fourthly, large scale analysis of actual reported fraud and predicted fraud is now possible. This shows that traditional approaches to fraud detection are found wanting; accuracy is low and false positives are high. This then has a physical effect on digital transaction processing, more genuine point-of-sale and online purchases are declined and those seeking to exploit the new digital systems often get away with it.

In the last few years, a more machine learning approach has been taken to the processing of transaction data. As machine learning models mature in academia, engineers have begun to attempt to apply them to the processing of transaction data. However, this again runs into problems. Even if engineers are provided with an academic or theoretical machine learning model and asked to implement it, this is not straightforward. For example, the problems of large-scale transaction processing systems come into play. Machine learning models do not have the luxury of unlimited inference time as in the laboratory. This means that it is simply not practical to implement certain models in a real-time setting, or that they need significant adaptation to allow real-time processing in the volume levels experienced by real-world servers. Moreover, engineers need to contend with the problem of implementing machine learning models on data that is siloed or partitioned based on access security, and in situations where the velocity of data updates is extreme. The problems faced by engineers building transaction processing systems may thus be seen as akin to those faced by network or database engineers; machine learning models need to be applied but meeting system throughput and query response time constraints set by the processing infrastructure. There are no easy solutions to these problems. Indeed, the fact that many transaction processing systems are confidential, proprietary, and based on old technologies means that engineers do not have the body of knowledge developed in these neighbouring fields and often face challenges that are unique to the field of transaction processing. Moreover, the field of large-scale practical machine learning is still young, and there are few established design patterns or textbooks that engineers can rely on.

SUMMARY OF THE INVENTION

In accordance with a first aspect, embodiments of the present invention provide a machine learning system for processing incoming event data associated with a transaction, the system comprising:

a) a first memory store comprising a database configured to store state data;
b) a state delta generator configured to:
   i) retrieve a version of the state data from the database;
   ii) receive respective incoming event data;
   iii) process the respective incoming event data and the retrieved version of the state data using a respective model to generate a respective event state delta comprising a set of pending updates to the state data; and
   iv) store the event state delta in a queue;
c) an updater configured to:
   i) retrieve the event state deltas from the queue;
   ii) retrieve the state data from the database;

iii) apply the pending updates from each event state delta to the state data to generate updated state data; and iv) update the database with the updated state data;

d) a second memory store comprising a cache configured to store a copy of each of the event state deltas with pending updates to the state data that are in the queue, each of said copies of event state deltas being stored in the cache together with a value indicative of the version of the state data used to generate said event state delta.

The first aspect of the invention also extends to a machine learning method of processing incoming event data associated with a transaction, the method comprising:

a) storing state data in a database in a first memory store;

b) in a state delta generation step:

i) retrieving a version of the state data from the database;

ii) receiving respective incoming event data;

iii) processing the respective incoming event data and the retrieved version of the state data using a respective model to generate a respective event state delta comprising a set of pending updates to the state data; and iv) storing the event state delta in a queue;

c) in an update step:

i) retrieving the event state deltas from the queue;

ii) retrieving the state data from the database;

iii) applying the pending updates from each event state delta to the state data to generate updated state data; and iv) updating the database with the updated state data; and d) storing, in a second memory store comprising a cache, a copy of each of the event state deltas with pending updates to the state data that are in the queue, each of said copies of event state deltas being stored in the cache together with a value indicative of the version of the state data used to generate said event state delta.

Thus it will be appreciated that embodiments of the present invention provide an improved arrangement which addresses a number of shortcomings associated with conventional machine learning systems and methods for processing events associated with transactions.

In accordance with a second aspect, embodiments of the present invention provide a machine learning system for processing incoming event data associated with a transaction, the system comprising:

a) a database configured to store state data;

b) a processing arrangement configured to use a model to generate one or more event state deltas with pending updates to the state data based on a version of the state data and incoming event data; and c) a cache configured to store a copy of each of the event state deltas with pending updates to the state data, each of said copies of event state deltas being stored in the cache together with a value indicative of the version of the state data used to generate said event state delta;

d) wherein the system is configured such that:

i) when the system receives a request to read a given version of the state data stored in the database, the system queries the cache to determine whether there are any event state deltas applicable to the given version of the state data;

ii) when the system determines that there are event state deltas that are applicable to the given version of the state data, the system supplies those event state deltas so determined alongside the given version of the state data.

The second aspect of the invention extends to a machine learning method for processing incoming event data associated with a transaction, the method comprising:

a) storing state data in a database;

b) using a model to generate one or more event state deltas with pending updates to the state data based on a version of the state data and incoming event data; and c) storing, in a cache, a copy of each of the event state deltas with pending updates to the state data, each of said copies of event state deltas being stored in the cache together with a value indicative of the version of the state data used to generate said event state delta;

d) receiving a request to read a given version of the state data stored in the database;

e) querying the cache to determine whether there are any event state deltas applicable to the given version of the state data; and f) when there are event state deltas that are applicable to the given version of the state data, supplying those event state deltas so determined alongside the given version of the state data.

In accordance with a third aspect, embodiments of the present invention provide a machine learning system for processing incoming event data associated with a transaction, the system comprising:

a) a first memory store comprising a database configured to store state data for use with a model configured to receive the incoming event data and to generate one or more event state deltas with pending updates to the state data; and b) a second memory store comprising a cache configured to store a copy of one or more event state deltas with pending updates to the state data received from the model, each of said copies of event state deltas being stored in the cache together with a value indicative of a version of the state data used to generate said event state delta.

The third aspect of the invention also extends to a machine learning method of processing incoming event data associated with a transaction, the method comprising:

a) storing state data in a database in a first memory store, said state data being for use with a model configured to receive the incoming event data and to generate one or more event state deltas with pending updates to the state data; and b) storing, in a second memory store comprising a cache, a copy of one or more event state deltas with pending updates to the state data received from the model, each of said copies of event state deltas being stored in the cache together with a value indicative of a version of the state data used to generate said event state delta.

In accordance with a fourth aspect, embodiments of the present invention provide a machine learning system for processing incoming event data associated with a transaction, the system comprising:

a) a first memory store comprising a database configured to store state data;

b) at least one state delta generator configured to:

i) retrieve a version of the state data from the database;

ii) receive respective incoming event data;

iii) process the respective incoming event data and the retrieved version of the state data using a respective model to generate a respective event state delta comprising a set of pending updates to the state data; and iv) store the event state delta in a queue; and c) an updater configured to:

i) retrieve the event state deltas from the queue;

ii) retrieve the state data from the database;

iii) apply the pending updates from each event state delta to the state data to generate updated state data; and iv) update the database with the updated state data;

wherein the system is configured such that all updates to the state data associated with incoming event data are made by applying one or more event state deltas.

The fourth aspect of the invention also extends to a machine learning method of processing incoming event data associated with a transaction, the method comprising:

a) storing state data in a database in a first memory store;

b) in a state delta generation step:

i) retrieving a version of the state data from the database;

ii) receiving respective incoming event data;

iii) processing the respective incoming event data and the retrieved version of the state data using a respective model to generate a respective event state delta comprising a set of pending updates to the state data; and iv) storing the event state delta in a queue; and c) in an update step:

i) retrieving the event state deltas from the queue;

ii) retrieving the state data from the database;

iii) applying the pending updates from each event state delta to the state data to generate updated state data; and iv) updating the database with the updated state data;

wherein all updates to the state data associated with incoming event data are made by applying one or more event state deltas.

In accordance with a fifth aspect, embodiments of the present invention provide a cache comprising a copy of one or more event state deltas with pending updates to state data for use with a model, each of said copies of event state deltas being stored in the cache together with a value indicative of a version of the state data used by the model to generate said event state delta.

This fifth aspect of the invention extends to a method of operating a cache comprising storing a copy of one or more event state deltas with pending updates to state data for use with a model, wherein each of said copies of event state deltas are stored in the cache together with a value indicative of a version of the state data used by the model to generate said event state delta.

Embodiments of the present invention may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

BRIEF DESCRIPTION OF THE DRAWINGS

Certain embodiments of the present invention will now be described with reference to the accompanying drawings, in which.

DETAILED DESCRIPTION

Figure 1A:
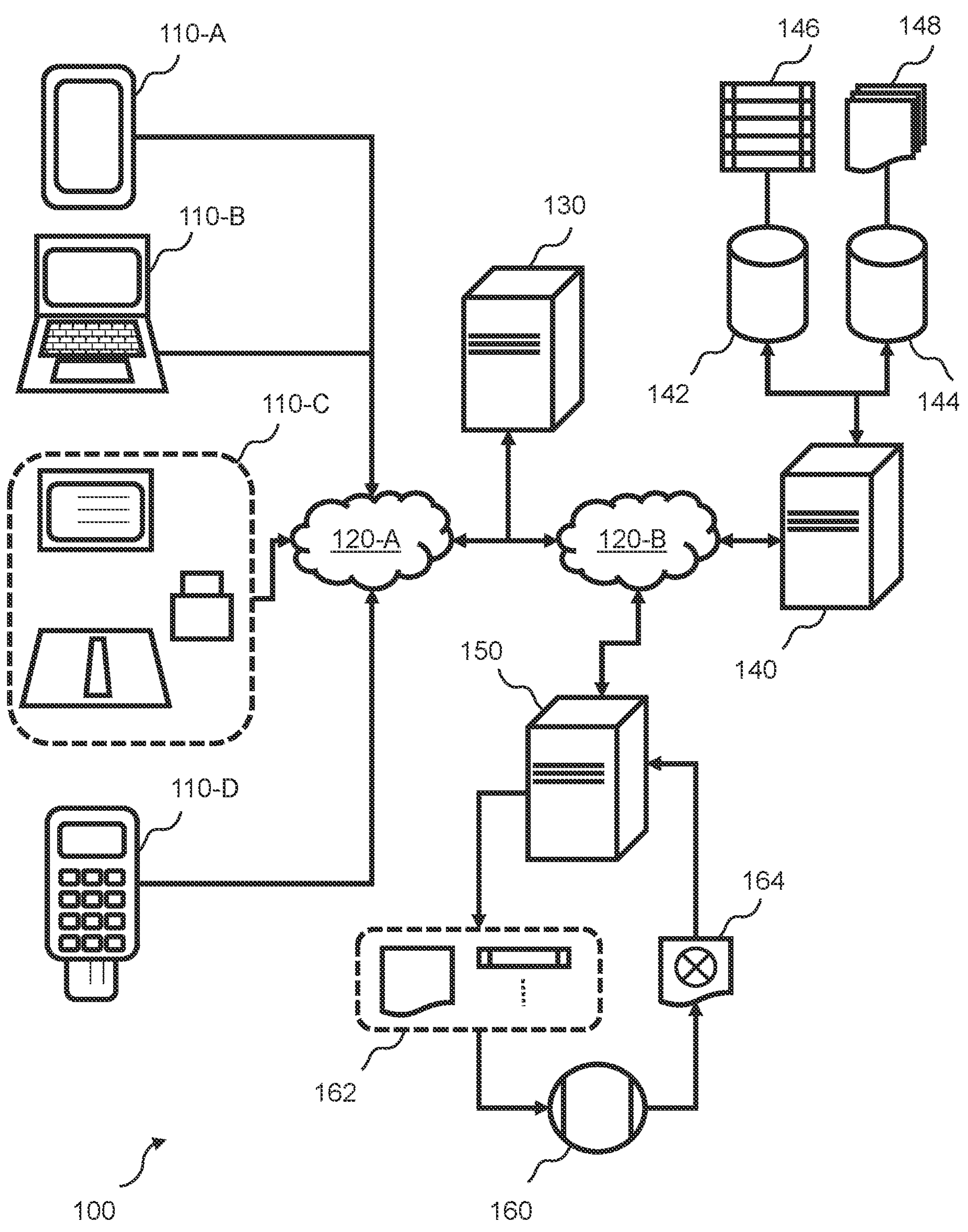
FIGS. 1A, 1B and 1C are schematic diagrams showing different example electronic infrastructures for transaction processing.

Certain exemplary embodiments are described herein which relate to a machine learning system for use in transaction processing. In certain embodiments, a machine learning system is applied in real-time, high-volume transaction processing pipelines to provide an indication of whether a transaction or entity matches previously observed and/or predicted patterns of activity or actions, e.g. an indication of whether a transaction or entity is "normal" or "anomalous". The term "behavioural" is used herein to refer to this pattern of activity or actions. The indication may comprise a scalar value normalised within a predefined range (e.g., 0 to 1) that is then useable to prevent fraud and other misuse of payment systems. The machine learning systems may apply machine learning models that are updated as more transaction data is obtained, e.g. that are constantly trained based on new data, so as to reduce false positives and maintain accuracy of the output metric. The present examples may be particularly useful for preventing fraud in cases where the physical presence of a payment card cannot be ascertained (e.g., online transactions referred to as "card-not-present") or for commercial transactions where high-value transactions may be routine and where it may be difficult to classify patterns of behaviour as "unexpected". As such, the present examples facilitate the processing of transactions as these transactions to being primarily "online", i.e. conducted digitally over one or more public communications networks.

Certain embodiments described herein allow machine learning models to be tailored to be specific to patterns of behaviour between certain pairs of entities (such as account holders) and categories (such as merchants, transaction amounts, times of day, and others). For example, the machine learning models may model entity-category-pair specific patterns of behaviour. The machine learning systems described herein are able to provide dynamically updating machine learning models despite large transaction flows and/or despite the need for segregation of different data sources.

Exemplary embodiments may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

Terms

In the context of this specification "comprising" is to be interpreted as "including". Aspects of the invention comprising certain elements are also intended to extend to alternative embodiments "consisting" or "consisting essentially" of the relevant elements.

The term "memory" or "memory store" should be understood to mean any means suitable for the storage of data and includes both volatile and non-volatile memory as appropriate for the intended application. Those skilled in the art will appreciate that this includes, but is not limited to, random access memory (RAM), static RAM (SRAM), dynamic RAM (DRAM), magnetic storage, solid-state storage, and flash memory. It will be appreciated that combinations of one or more of these may also be used for the storage of data, as technically appropriate (e.g. using faster access volatile memory for frequently accessed data).

The term "data" is used in different contexts herein to refer to digital information, such as that represented by known bit structures within one or more programming languages. In use, data may refer to digital information that is stored as bit sequences within computer memory. Certain machine learning models may operate on structured arrays of data of a predefined bit format. Those skilled in the art will readily appreciated that these may be referred to as arrays, multidimensional arrays, matrices, vectors, tensors, or other such similar terms. It should be noted that for machine learning methods multidimensional arrays or tensors, e.g. with a defined extent in multiple dimensions, may be "flattened" so as to be represented (e.g., within memory) as a sequence or vector of values stored according to the predefined format (e.g., n-bit integer or floating point number, signed or unsigned). Hence, the term "tensor" as used herein covers multidimensional arrays with one or more dimensions (e.g., vectors, matrixes, volumetric arrays etc.).

The term "structured numeric representation" is used to refer to numeric data in a structured form, such as an array of one or more dimensions that stores numeric values with a common data type, such as integers or float values. A structured numeric representation may comprise a vector or tensor (as used within machine learning terminology). A structured numeric representation is typically stored as a set of indexed and/or consecutive memory locations, e.g. a one-dimensional array of 64-bit floats may be represented in computer memory as a consecutive sequence of 64-bit memory locations in a 64-bit computing system.

The term "transaction data" is used herein to refer to electronic data that is associated with a transaction. A transaction comprises a series of communications between different electronic systems to implement a payment or exchange. In general, transaction data may comprise data indicating events (e.g., actions undertaken in time) that relate to, and may be informative for, transaction processing. Transaction data may comprise structured, unstructured and semi-structured data, or any combination thereof. Transaction data may also include data associated with a transaction, such as data used to process a transaction. In certain cases, transaction data may be used broadly to refer actions taken with respect to one or more electronic devices. Transaction data may take a variety of forms depending on the precise implementation. However, different data types and formats may be converted by pre or post processing as appropriate.

The term "interface" is used herein to refer to any physical and/or logical interface that allows for one or more of data input and data output. An interface may be implemented by a network interface adapted to send and/or receive data, or by retrieving data from one or more memory locations, as implemented by a processor executing a set of instructions. An interface may also comprise physical (network) couplings over which data is received, such as hardware to allow for wired or wireless communications over a particular medium. An interface may comprise an application programming interface and/or a method call or return. For example, in a software implementation, an interface may comprise passing data and/or memory references to a function initiated via a method call, where the function comprises computer program code that is executed by one or more processors; in a hardware implementation, an interface may comprise a wired interconnect between different chips, chipsets or portions of chips. In the drawings, an interface may be indicated by a boundary of a processing block that has an inward and/or outward arrow representing a data transfer.

The terms "component" and "module" are used interchangeably to refer to either a hardware structure that has a specific function (e.g., in the form of mapping input data to output data) or a combination of general hardware and specific software (e.g., specific computer program code that is executed on one or more general purpose processors). A component or module may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor.

The term "machine learning model" is used herein to refer to at least a hardware-executed implementation of a machine learning model or function. Known models within the field of machine learning include logistic regression models, Naïve Bayes models, Random Forests, Support Vector Machines and artificial neural networks. Implementations of classifiers may be provided within one or more machine learning programming libraries including, but not limited to, scikit-learn, TensorFlow, and PyTorch.

The term "map" is used herein to refer to the transformation or conversion of a first set of data values to a second set of data values. The two sets of data values may be arrays of different sizes, with an output array being of lower dimensionality than an input array. The input and output arrays may have common or different data types. In certain examples, the mapping is a one-way mapping to a scalar value.

The term "neural network architecture" refers to a set of one or more artificial neural networks that are configured to perform a particular data processing task. For example, a "neural network architecture" may comprise a particular arrangement of one or more neural network layers of one or more neural network types. Neural network types include convolutional neural networks, recurrent neural networks, and feedforward neural networks. Convolutional neural networks involve the application of one or more convolution operations. Recurrent neural networks involve an internal state that is updated during a sequence of inputs. Recurrent neural networks are thus seen as including a form of recurrent or feedback connection whereby a state of the recurrent neural network at a given time or iteration (e.g., t)

is updated using a state of the recurrent neural network at a previous time or iteration (e.g., t−1). Feedforward neural networks involve transformation operations with no feedback, e.g. operations are applied in a one-way sequence from input to output. Feedforward neural networks include plain "neural networks" and "fully-connected" neural networks". Those skilled in the art will appreciate that a "multilayer perceptron" is a term used to describe a fully-connected layer, and is a special case of a feedforward neural network.

The term "deep" neural network is used to indicates that the neural network comprises multiple neural network layers in series (it should be noted this "deep" terminology is used with both feedforward neural networks and recurrent neural networks). Certain examples described herein make use of recurrent and fully-connected neural networks.

A "neural network layer", as typically defined within machine learning programming tools and libraries, may be considered an operation that maps input data to output data. A "neural network layer" may apply one or more parameters such as weights to map input data to output data. One or more bias terms may also be applied. The weights and biases of a neural network layer may be applied using one or more multidimensional arrays or matrices. In general, a neural network layer has a plurality of parameters whose value influence how input data is mapped to output data by the layer. These parameters may be trained in a supervised manner by optimizing an objective function. This typically involves minimizing a loss function. Certain parameters may also be pre-trained or fixed in another manner. Fixed parameters may be considered as configuration data that controls the operation of the neural network layer. A neural network layer or architecture may comprise a mixture of fixed and learnable parameters. A recurrent neural network layer may apply a series of operations to update a recurrent state and transform input data. The update of the recurrent state and the transformation of the input data may involve transformations of one or more of a previous recurrent state and the input data. A recurrent neural network layer may be trained by unrolling a modelled recurrent unit, as may be applied within machine learning programming tools and libraries. Although a recurrent neural network may be seen to comprise several (sub) layers to apply different gating operations, most machine learning programming tools and libraries refer to the application of the recurrent neural network as a whole as a "neural network layer" and this convention will be followed here. Lastly, a feedforward neural network layer may apply one or more of a set of weights and biases to input data to generate output data. This operation may be represented as a matrix operation (e.g., where a bias term may be included by appending a value of 1 onto input data). Alternatively, a bias may be applied through a separate addition operation. As discussed above, the term "tensor" is used, as per machine learning libraries, to refer to an array that may have multiple dimensions, e.g. a tensor may comprise a vector, a matrix or a higher dimensionality data structure. In preferred example, described tensors may comprise vectors with a predefined number of elements.

To model complex non-linear functions, a neural network layer may be followed by a non-linear activation function. Common activation functions include the sigmoid function, the tan h function, and Rectified Linear Units (RELUs). Many other activation functions exist and may be applied. An activation function may be selected based on testing and preference. Activation functions may be omitted in certain circumstances, and/or form part of the internal structure of a neural network layer.

The example neural network architectures described herein may be configured via training. In certain cases, "learnable" or "trainable" parameters may be trained using an approach called backpropagation. During backpropagation, the neural network layers that make up each neural network architecture are initialized (e.g., with randomized weights) and then used to make a prediction using a set of input data from a training set (e.g., a so-called "forward" pass). The prediction is used to evaluate a loss function. For example, a "ground-truth" output may be compared with a predicted output, and the difference may form part of the loss function. In certain examples, a loss function may be based on an absolute difference between a predicted scalar value and a binary ground truth label. The training set may comprise a set of transactions. If gradient descent methods are used, the loss function is used to determine a gradient of the loss function with respect to the parameters of the neural network architecture, where the gradient is then used to back propagate an update to the parameter values of the neural network architecture. Typically, the update is propagated according to the derivative of the weights of the neural network layers. For example, a gradient of the loss function with respect to the weights of the neural network layers may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, working back through the neural network layers in turn.

Overview

Exemplary embodiments of provide a machine learning system for processing incoming event data associated with a transaction, the system comprising:

a) a first memory store comprising a database configured to store state data;

b) a state delta generator configured to:

i) retrieve a version of the state data from the database;

ii) receive respective incoming event data;

iii) process the respective incoming event data and the retrieved version of the state data using a respective model to generate a respective event state delta comprising a set of pending updates to the state data; and iv) store the event state delta in a queue;

c) an updater configured to:

i) retrieve the event state deltas from the queue;

ii) retrieve the state data from the database;

iii) apply the pending updates from each event state delta to the state data to generate updated state data; and iv) update the database with the updated state data;

d) a second memory store comprising a cache configured to store a copy of each of the event state deltas with pending updates to the state data that are in the queue, each of said copies of event state deltas being stored in the cache together with a value indicative of the version of the state data used to generate said event state delta.

Exemplary embodiments also extend to a machine learning method of processing incoming event data associated with a transaction, the method comprising:

a) storing state data in a database in a first memory store;

b) in a state delta generation step:

i) retrieving a version of the state data from the database;

ii) receiving respective incoming event data;

iii) processing the respective incoming event data and the retrieved version of the state data using a respective model to generate a respective event state delta comprising a set of pending updates to the state data; and iv) storing the event state delta in a queue;

c) in an update step:

i) retrieving the event state deltas from the queue;

ii) retrieving the state data from the database;

iii) applying the pending updates from each event state delta to the state data to generate updated state data; and iv) updating the database with the updated state data; and d) storing, in a second memory store comprising a cache, a copy of each of the event state deltas with pending updates to the state data that are in the queue, each of said copies of event state deltas being stored in the cache together with a value indicative of the version of the state data used to generate said event state delta.

Thus it will be appreciated that exemplary embodiments provide an improved arrangement which addresses a number of shortcomings associated with conventional machine learning systems and methods for processing events associated with transactions.

Firstly, exemplary embodiments may significantly reduce (and potentially eliminate altogether) negative effects due to state lag associated with using state deltas. Those skilled in the art will appreciate that exemplary embodiments may make use of a separate cache of pending state deltas that are waiting to be applied to the canonical state, with information on what version of the state the deltas are being applied to. When a state delta is created, as well as being queued to be applied to the database, it is also put into the cache keyed on the underlying state version it was generated on top of.

The Applicant has appreciated that, by using a separate cache to store copies of pending state deltas, the state data may be read from the database together (e.g. by the state delta generator or by any other component or system requesting the state data) with any pending state updates that are stored in the cache that are applicable to the version of the state data being retrieved. This may reduce the state lag significantly, potentially making the state lag negligible.

It will be appreciated that the term 'version' as used herein in respect of the state data should be understood to mean the state data stored in the database at a particular point in time. The database need not store multiple versions of the state data simultaneously, and in general only a single version of the state data may exist in the database at any given time, wherein that state data is updated when necessary as outlined above. When the state delta generator (or any other component) reads the state data from the database, it may simply read 'the' state data that is present in the database at that moment in time, where that 'snapshot' of the state data is referred to as a particular 'version' of the state data for ease of reference.

A timestamp and/or a version number may be associated with the state data where that timestamp is updated and/or that version number is incremented each time the state data in the database is updated. Such a timestamp or version number may be used as the value indicative of the version of the state data that was used in the generation of state deltas.

The event state delta(s) generated by the state delta generator may be stored in the cache using a dedicated process, or the state delta generator itself may, in some embodiments, be configured to store a copy of each state delta it generates in the cache.

In some embodiments, the system is configured such that when the system receives a request to read a given version of the state data stored in the database, the system queries the cache to determine whether there are any event state deltas that should be applied to said given version of the state data. In some such embodiments, when the system determines that there are event state deltas that should be applied to the given version of the state data, the system supplies those event state deltas so determined alongside the given version of the state data.

In a particular set of embodiments, the system generates a transient updated state data using the given version of the state data and the applicable event state deltas before supplying the transient updated state data. It will be appreciated that the generation of the transient state data does not result in the state data stored in the database being updated at that time, and the transient updated state data can be discarded after the relevant event has been processed. Alternatively, the requester of the state data may be supplied the applicable state deltas directly (together with the state data from the database) such that the requester can apply the relevant state deltas to the given version of the state data they are provided with themselves.

Thus, in some embodiments, the system is configured such that:

i) when the system receives a request to read a given version of the state data stored in the database, the system queries the cache to determine whether there are any event state deltas applicable to the given version of the state data; and ii) when the system determines that there are event state deltas that are applicable to the given version of the state data, the system supplies those event state deltas so determined alongside the given version of the state data.

As outlined above, requests to read state data stored in the database may be responded to with the state data and any applicable state deltas. In a particular set of embodiments, the state deltas that are applicable to the state data retrieved by the state delta generator(s) are applied to said retrieved state data prior to processing the respective incoming event data and the retrieved version of the state data using the respective model. The state delta generator(s) may be configured to apply the state deltas themselves, or this may be carried out by a separate component within the system, e.g. a dedicated pre-processing unit that applies state deltas to retrieved state data before it is used by the state delta generator(s).

When the updated state data is written to the database, copies of the event state deltas corresponding to older versions of the state data can be removed from the cache after the updated state data is written to the database. Thus, in some embodiments, copies of event state deltas having a value indicative of a version of the state data older than that of the state data being updated are removed from the cache after the updated state data is written to the database.

In a set of embodiments, the system is configured for use in real-time anomaly detection, particularly in a transaction processing system. In a particular set of embodiments, the system is a machine learning transaction processing system. Thus in certain embodiments, the incoming event data comprises transaction data or is derived from transaction data. The incoming event data may, additionally or alternatively, comprise data relating to deposits, address updates, anti-money laundering (AML) workflow movements, or any other events associated with digital payments or transaction processing systems.

In some embodiments, the transaction data comprises electronic data associated with one or more transactions, each transaction respectively comprising a series of communications between different electronic systems to implement a payment or exchange.

The architecture provided by exemplary embodiments allows for concurrent access, in which multiple state delta generators may be used and act independently of one another, using the same shared database of state data. Thus, in some embodiments, the system comprises:

a plurality of state delta generators, each configured to:

i) retrieve a version of the state data from the database;

ii) receive respective incoming event data;

iii) process the respective incoming event data and the retrieved version of the state data using a respective model to generate a respective event state delta comprising a set of pending updates to the state data; and iv) store the event state delta in the queue;

wherein copies of each of the event state deltas generated by each of the state delta generators are stored in the cache together with a value indicative of the version of the state data used to generate the respective event state delta.

In general, there may be multiple state delta generators and the updater. In a particular set of embodiments in which there are multiple state delta generators and multiple updaters, one or more of the multiple updaters may serve more than one state delta generator.

In general, more than one cache may be supplied, e.g. with one cache being provided per updater when multiple updaters are used. Additionally, or alternatively, one or more updaters may share a cache.

The model applied by the state delta generator may comprise a machine learning model and/or an adaptive ruleset. Where multiple state delta generators are provided in accordance with some exemplary embodiments, each may apply a respective machine learning model and/or adaptive ruleset, as appropriate.

Additionally, or alternatively, the (or each) state delta generator may be configured to use a plurality of models when processing the incoming event data, wherein the use of each model generates a respective set of pending updates to the state data, wherein a state delta comprises each set of pending updates to the state data, wherein each state delta is stored in the queue, and wherein the cache is configured to store a copy of the or each such state delta. Each model may be different, and each model may comprise a respective machine learning model and/or adaptive ruleset, as appropriate. It will be appreciated that a separate respective state delta may be generated for each model that contains the respective set of updates to the state data arising from that model.

Additionally, or alternatively, a state delta may comprise sets of updates arising from more than one model, and potentially all of the updates from all the models within a particular state delta generator may be contained within one state delta generated by that state delta generator.

The 'event' state deltas applied by the state delta generator (s) are generated from the incoming event data and the stored state data, using a model (e.g. an appropriate machine learning model). The Applicant has appreciated, however, that there may be updates to the state data arising from 'batch' processes as well as from live transactions (referred to as 'batch updates' below). Examples of such batch processes include changes of details such as a change of a card holder's address, or a change in details of a particular entity such as a merchant. Additionally, or alternatively, some transaction data may be sent in batches, rather than in real time, e.g. for retroactive analysis (e.g. scoring a batch of past transactions for anomalies).

In some embodiments, the updater is configured to receive one or more batch state deltas comprising a set of pending batch updates to the state data; and to apply the pending batch updates from each batch state delta to the state data when generating the updated state data. Where multiple updaters are provided, as per certain embodiments of the invention as described below, one or more of such multiple updaters may be configured to apply updates associated with batch state deltas.

The configuration of which state delta generators (for live events) and batch state delta generators (for batch events) are associated with which updaters may require consideration. If both live and batch events are updating the same set of data, then it may be advantageous to allocate the updaters by entity (where there can be multiple entities in each event, e.g. different account holders or merchants), so that live updates for a first customer (customer1) and batch updates for customer1 go to the same updater. In such a configuration, the single block of data for customer1 in the database is updated consistently. When batch and live updates different sets of state data (both can be read by both systems), then a different set of updaters can be used for batch, but again allocated by entity id within the block of state that set of updaters is responsible for. Live and batch updates for a second customer (customer2) could go to a different updater to the one used for customer1, so long as the live and batch updates for customer2 go to the updater as one another.

Thus in such embodiments, the respective updates associated with the event state deltas and batch state deltas can be applied at the same time. Some or all event state deltas may be applied at the same time as some or all of the batch state deltas, i.e. 'batch' updates and 'live' updates can be applied concurrently. In conventional machine learning systems for processing transaction data, updates from batch processing may 'hold up' processing of live events while the batch updates are being applied. However, exemplary embodiments allow both types of updates to be applied when ready, by holding such updates in the queue, with a copy in the cache, until the updater is ready to apply them. Advantageously, the cached copies of the state deltas with their pending updates negates the issue with state liveness as outlined above—requests to read the state data from the database can be responded to with both the stored data and any pending updates applicable to that version, which may include updates associated with both live and batch events.

The batch state deltas may be generated externally and supplied to the updater, however in some embodiments the system comprises a batch state delta generator configured to generate the batch state deltas. Thus, in some embodiments, the system comprises a batch state delta generator configured to:

i) generate a respective batch state delta comprising a set of pending batch updates to the state data; and ii) store the batch state delta in the queue;

wherein the cache is further configured to store copies of each of the batch state deltas with pending batch updates to the state data that are in the queue, each of said copies of batch state deltas being stored in the cache together with a value indicative of the version of the state data to which said batch state delta is applicable.

The batch generator may generate the batch state delta(s) based on received batch request data. Such batch request data may comprise information about batch changes that are required, such as a change in details for an entity for which the database holds information. Such batch request data may be received from an external device or system, or it may be generated elsewhere within the system, as appropriate.

The batch state delta(s) generated by the batch state delta generator may be stored in the cache using a dedicated process, or the batch state delta generator itself may, in some embodiments, be configured to store a copy of each batch state delta it generates in the cache.

In some embodiments, the system is configured such that when the system receives a request to read a given version of the state data stored in the database, the system queries the cache to determine whether there are any batch state deltas that should be applied to said given version of the state data. In some such embodiments, when the system determines that there are batch state deltas that should be applied to the given version of the state data, the system supplies those batch state deltas so determined alongside the given version of the state data. Thus in a particular set of embodiments, a request to read the state data may be replied to with the state data together with one or more event state deltas and/or one or more batch state deltas.

In a set of embodiments, there may be two or more such batch state delta generators.

The system may, in some embodiments, employ multiple updaters that act independently of one another to update a shared database of state data. Thus, in some embodiments, the system comprises:

a plurality of updaters, each configured to:

i) retrieve one or more of the event state deltas from the queue;

ii) retrieve the state data from the database;

iii) apply the pending updates from each respective event state delta to the state data to generate updated state data; and iv) update the database with the updated state data.

In some embodiments, the state data is indexed by an identifier. In some such embodiments, the identifier is an entity identifier. In a particular set of embodiments, each entity identifier corresponds to an entity for which real-time anomaly detection is being performed.

The state data retrieved from or stored to (in the case of updated state data) the database may, in some embodiments, be associated with a particular identifier, where the identifier is associated with the transaction. For example, the transaction may involve a particular cardholder having a particular entity identifier (or simply ‘entity id’). The state data retrieved from the database may then be the state data stored against that particular entity id, and the eventual updated state data would also be stored in the database against that entity id (typically overwriting the previous data for that entity id).

Where multiple updaters are provided, each may be assigned on a per-entity or per entity group basis. For example, each updater may be configured to handle the state deltas and updates of the database in respect of transactions associated with a particular entity or a particular group of entities. This grouping may be allocated based on common features such as supermarkets’, however in some embodiments the entities may be grouped to ease system load, i.e. to spread the number of updates more evenly across multiple updaters. Entities may be allocated to updaters using a consistent partitioning scheme. Examples include partitioning by type of entity, distributing the entities using expected or observed frequency of entity updates for load-balancing across updaters, or using a hash of the entity id and/or other uniquely identifying data. Those skilled in the art will appreciate that other partitioning schemes can be used within the scope of the claimed invention.

It will be appreciated that there are a number of different mechanisms, known in the art per se, that could be used to implement the cache. However, in some embodiments, the cache is random access. In a particular set of embodiments, the second memory store comprises random access memory. The Applicant has appreciated that the use of random access is particularly advantageous because the various state deltas applicable to a particular version of the database may be stored and retrieved from memory non sequentially.

In some embodiments, the system comprises an event store, for example a distributed event store such as Apache Kafka®. It will be appreciated that Kafka® (and similar platforms known in the art per se) uses processes (called ‘producers’ in Kafka®) that submit messages to a ‘topic’ which may be divided into different ‘partitions’. Messages within the topics (and partitions) are ordered by their respective ‘offset’, which dictates the position of each message within the respective partition. The messages are also generally provided with a timestamp. Other processes (called ‘consumers’ in Kafka®) then read messages from partitions.

Incoming event data may be received via a suitable interface. However, in some embodiments, the system comprises an event application programming interface (API) through which event data is received. In a particular set of embodiments, the event API comprises the state delta generator. In other words, the state delta generator may exist within an API that handles incoming event data. Such an event API may be exposed such that external systems and software can interface with the state delta generator(s).

Where multiple state delta generators are used, a single event API may include multiple state delta generators. Additionally, or alternatively, multiple event APIs may be provided, each of which comprise one or more state delta generators.

The Applicant has appreciated that the provision of the cache may lead to ‘bottlenecking’ at the time when updates are applied if there are a large number of state deltas for the updater (or a specific updater when multiple are provided) to apply. While the overall degree of bottlenecking will generally be less than the bottlenecking associated with prior art arrangements, in some embodiments the system further comprises a state delta combiner configured to combine at least two state deltas prior to the updated state data being generated. In other words, the pending updates associated with multiple state deltas may be combined to lessen the load on the updater (or any specific updater). In certain arrangements, state deltas may readily be summed to combine them, e.g. if a first state delta would change a particular state data value by +7 and a second state delta would change that same state value by −2, a combination of the two state deltas would change that state value by +5 (i.e. the net change of +7 and −2). The state delta combiner may advantageously provide reductions in load if the combined delta can be applied in less time than applying the original deltas consecutively.

Additionally, or alternatively, the bottlenecking referred to above may be addressed by keeping entities in an internal cache of the updater. The system may be configured to batch multiple reads for the same entity and apply them simultaneously. Thus when an updater has one or more ‘high-frequency’ entities (i.e. that are updated frequently), rather than reading from the database for every state delta for that entity, it keeps the most recent state stored in memory, so that it doesn’t read from the database every time—instead it may just overwrite the state data in the database with what is in memory after each state delta (or on a timer, or after every so many state deltas such as after every five state deltas, etc.). This removes the need to read from the database every time, and so may give a performance boost and reduce database load, when there are some high-frequency entities in the incoming state delta queue.

Example Transaction Processing System

A non-limiting exemplary embodiment of a machine learning system in accordance with an embodiment of the invention is described below. FIGS. 1A to 5B provide context for the machine learning system.

Figure 1B:
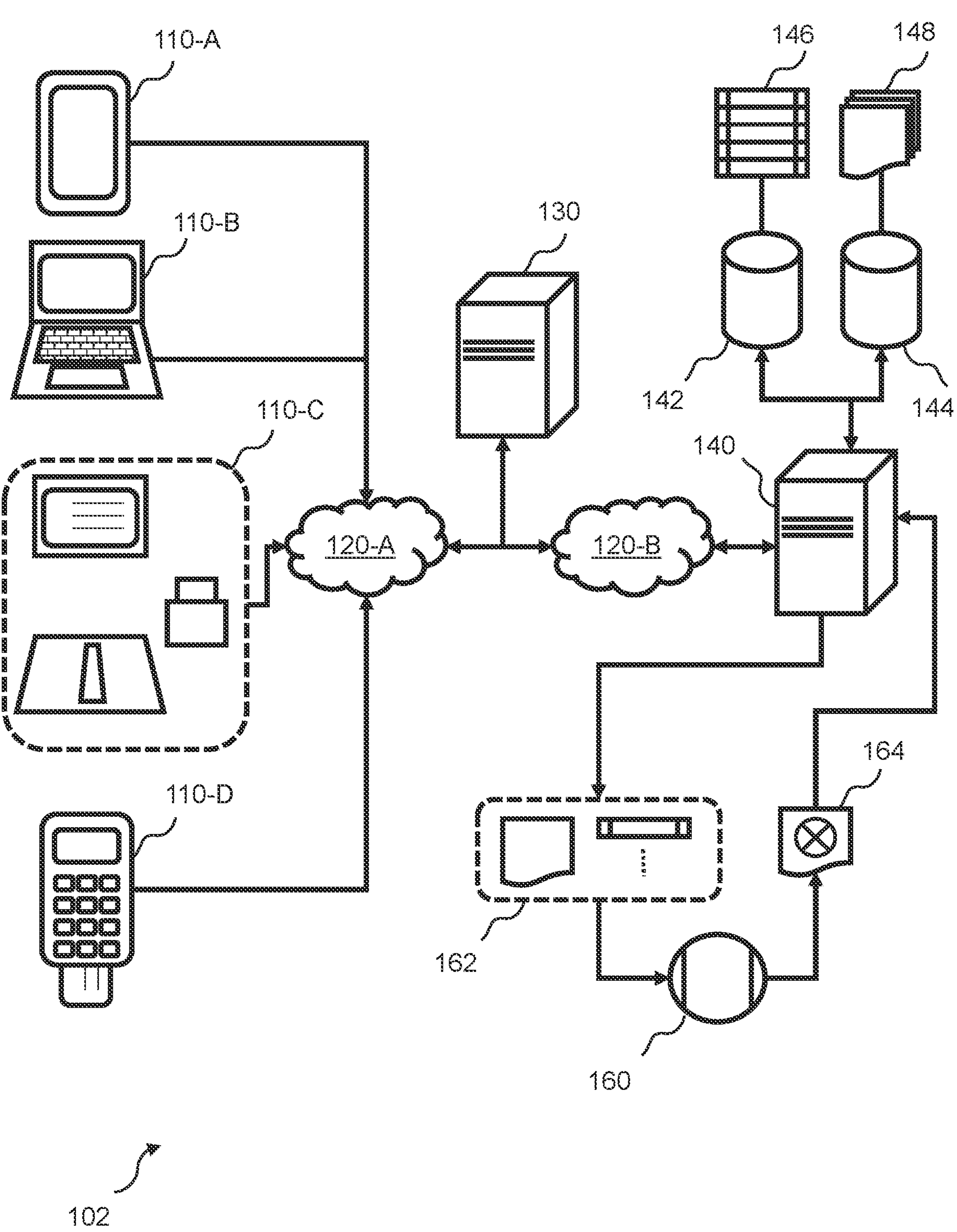
Figure 1C:
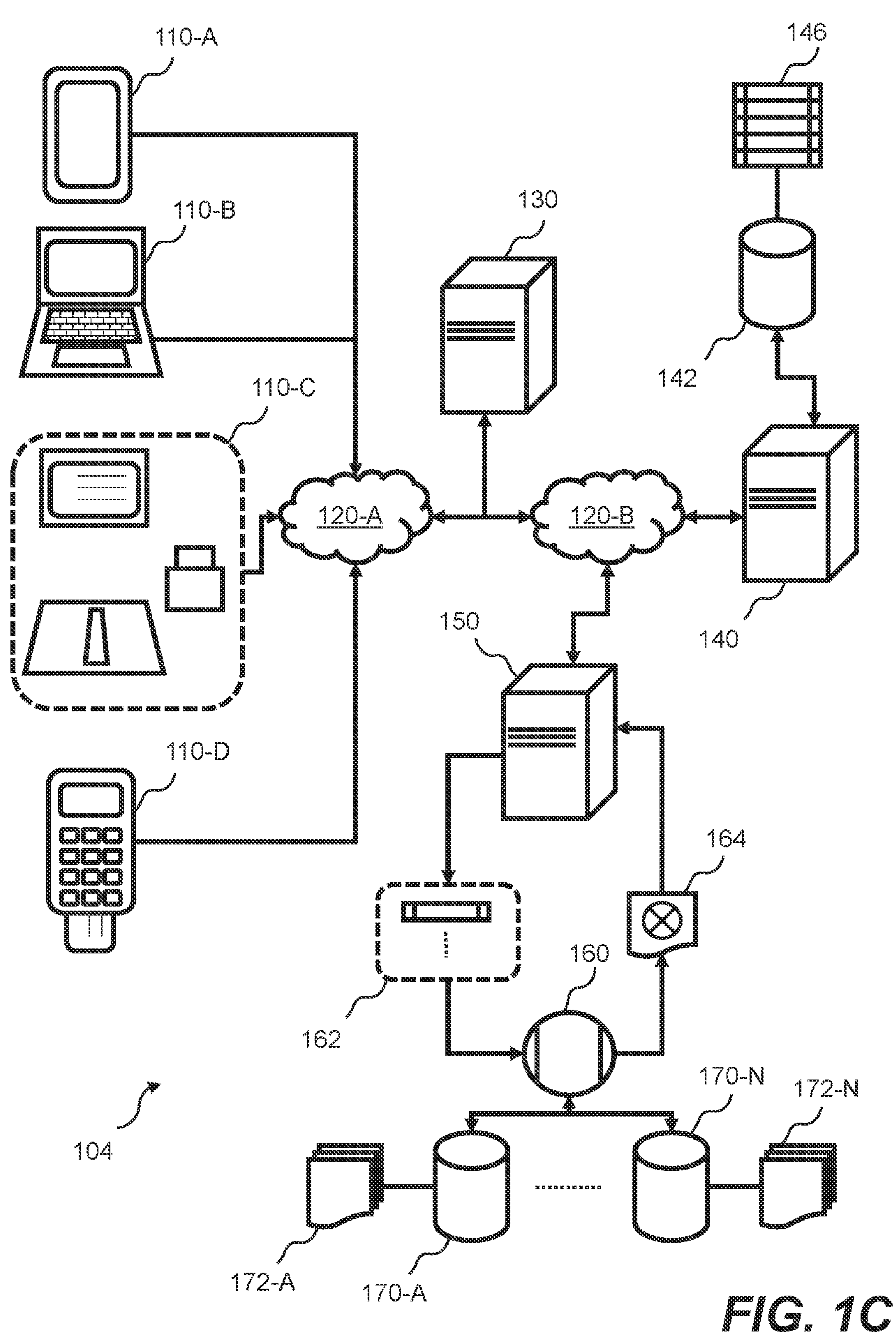

FIGS. 1A to 1C show a set of example transaction processing systems 100, 102, 104. These example transaction processing systems are described to provide context for the inventions discussed herein but should not be seen as limiting; the configuration of any one implementation may differ based on the specific requirements of that implementation. However, the described example transaction processing systems allow those skilled in the art to identify certain high-level technical features that are relevant for the description below. The three example transaction processing systems 100, 102, 104 show different areas where variation may occur.

FIGS. 1A to 1C show a set of client devices 110 that are configured to initiate a transaction. In this example, the set of client devices 110 comprise a smartphone 110-A, a computer 110-B, a point-of-sale (POS) system 110-C and a portable merchant device 110-D. These client devices 110 provide a set of non-exhaustive examples. Generally, any electronic device or set of devices may be used to undertake a transaction. In one case, the transaction comprises a purchase or payment. For example, the purchase or payment may be an online or mobile purchase or payment made by way of the smartphone 110-A or the computer 110-B, or may be a purchase or payment made at a merchant premises, such as via the POS system 110-C or the portable merchant device 110-D. The purchase or payment may be for goods and/or services.

In FIGS. 1A to 1C, the client devices 110 are communicatively coupled to one or more computer networks 120. The client devices 110 may be communicatively coupled in a variety of ways, including by one or more wired and/or wireless networks including telecommunications networks. In preferred examples, all communications across the one or more computer networks are secured, e.g. using Transport Layer Security (TLS) protocols. In FIG. 1A, two computer networks are shown 120-A and 120-B. These may be separate networks or different portions of a common network. The first computer network 120-A communicatively couples the client devices 110 to a merchant server 130. The merchant server 130 may execute a computer process that implements a process flow for the transaction. For example, the merchant server 130 may be a back-end server that handles transaction requests received from the POS system 110-C or the portable merchant device 110-D or may be used by an online merchant to implement a website where purchases may be made. It will be appreciated that the examples of FIGS. 1A to 1C are necessary simplifications of actual architectures; for example, there may be several interacting server devices that implement an online merchant, including separate server devices for providing HyperText Markup Language (HTML) pages detailing a product and/or service and for handling a payment process.

In FIG. 1A, the merchant server 130 is communicatively coupled to a further set of back-end server devices to process the transaction. In FIG. 1A, the merchant server 130 is communicatively coupled to a payment processor server 140 via a second network 120-B. The payment processor server 140 is communicatively coupled to a first data storage device 142 storing transaction data 146 and a second data storage device 144 storing ancillary data 148. The transaction data 146 may comprise batches of transaction data relating to different transactions that are undertaken over a period of time. The ancillary data 148 may comprise data associated with the transactions, such as records storing merchant and/or end user data. In FIG. 1A, the payment processor server 140 is communicatively coupled to a machine learning server 150 via the second network 120-B. The machine learning server 150 implements a machine learning system 160 for the processing of transaction data. The machine learning system 160 is arranged to receive input data 162 and to map this to output data 164 that is used by the payment processor server 140 to process a particular transaction, such as one arising from the client devices 110. In one case, the machine learning system 160 receives at least transaction data associated with the particular transaction and provides an alert or numeric output that is used by the payment processor server 140 to determine whether the transaction is to be authorised (i.e., approved) or declined. As such, the output of the machine learning system 160 may comprise a label, alert or other indication of fraud, or general malicious or anomalous activity. The output may comprise a probabilistic indication, such as a score or probability. In one case, the output data 164 may comprise a scalar numeric value. The input data 162 may further comprise data derived from one or more of the transaction data 146 and the ancillary data 148. In one case, the output data 164 indicates a level of deviation from a specific expected pattern of behaviour based on past observations or measurements. For example, this may indicate fraud or criminal behaviour as this often differs significantly from observed patterns of behaviour, especially on a large scale. The output data 164 may form a behavioural measure. The expected pattern of behaviour may be defined, either explicitly or implicitly, based on observed interactions between different entities within the transaction process flow, such as end users or customers, merchants (including point-of-sale and back-end locations or entities where these may differ), and banks.

The machine learning system 160 may be implemented as part of a transaction processing pipeline. An example transaction processing pipeline is described later with respect to FIGS. 5A and 5B. A transaction processing pipeline may comprise electronic communications between the client devices 110, merchant server 130, payment processor server 140 and machine learning server 150. Other server devices may also be involved, such as banking servers that provide authorisation from an issuing bank. In certain cases, client devices 110 may directly communicate with the payment processor server 140. In use, a transaction processing pipeline typically needs to be completed within one or two hundred milliseconds. In general, sub-second processing times may be deemed real-time (e.g., human beings typically perceive events on a timespan of 400 ms). Furthermore, 100-200 ms may be the desired maximum latency of the full round-trip-time for transaction processing; within this timespan, the time allotted for the machine learning system 160 may be a small fraction of this full amount, such as 10 ms (i.e., less that 5-10% of the target processing time), as most of the time may be reserved for other operations in the transaction processing flow. This presents a technical constraint for the implementation of the machine learning system 160. Furthermore, in real-world implementations, average processing volumes may be on the order of 1000-2000 a second. This means that most "off-the-shelf"

machine learning systems are not suitable to implement machine learning system 160. It further means that most machine learning approaches described in academic papers cannot be implemented within the aforementioned transaction processing pipeline without non-obvious adaptations. There is also a problem that anomalies are, by their very nature, rare events and so accurate machine learning systems are difficult to train.

FIG. 1B shows a variation 102 of the example transaction processing system 100 of FIG. 1A. In this variation 102, the machine learning system 160 is implemented within the payment processor computer infrastructure, e.g. executed by the payment processor server 140 and/or executed on a locally coupled server within the same local network as the payment processor server 140. The variation 102 of FIG. 1B may be preferred for larger payment processors as it allows faster response times, greater control, and improved security. However, functionally, the transaction processing pipeline may be similar to that of FIG. 1A. For example, in the example of FIG. 1A, the machine learning system 160 may be initiated by a secure external application programming interface (API) call, such as a Representation State Transfer (REST) API call using Hypertext Transfer Protocol Secure (HTTPS), while in FIG. 1B, the machine learning system 160 may be initiated by an internal API call, but where a common end API may handle both requests (e.g., the REST HTTPS API may provide an external wrapper for the internal API).

FIG. 1C shows another variation 104 of the example transaction processing system 100 of FIG. 1A. In this variation 104, the machine learning system 160 is communicatively coupled to local data storage devices 170. For example, data storage devices 170 may be on the same local network as machine learning server 150 or may comprise a local storage network accessible to the machine learning server 150. In this case, there are a plurality of local data storage devices 170-A to 170-N, where each data storage device stores partitioned ancillary data 172. The partitioned ancillary data 172 may comprise parameters for one or more machine learning models. In one case, the ancillary data 172 may comprise a state for machine learning models, where the state may relate to a specific entity such as a user or merchant. The partitioning of the ancillary data 172 may need to be applied to meet security requirements set by a third party, such as the payment processor, one or more banks and/or one or more merchants. In use, the machine learning system 160 accesses the ancillary data 172-A to 172-N via the plurality of local data storage devices 170-A to 170-N based on the input data 162. For example, the input data 162 may be received by way of an API request from a particular source and/or may comprise data that identifies that a particular partition is to be used to handle the API request. More details of different storage systems that may be applied to meet security requirements are set out in FIGS. 2A and 2B.

Example Data Storage Configurations

Figures 2A, 2B:
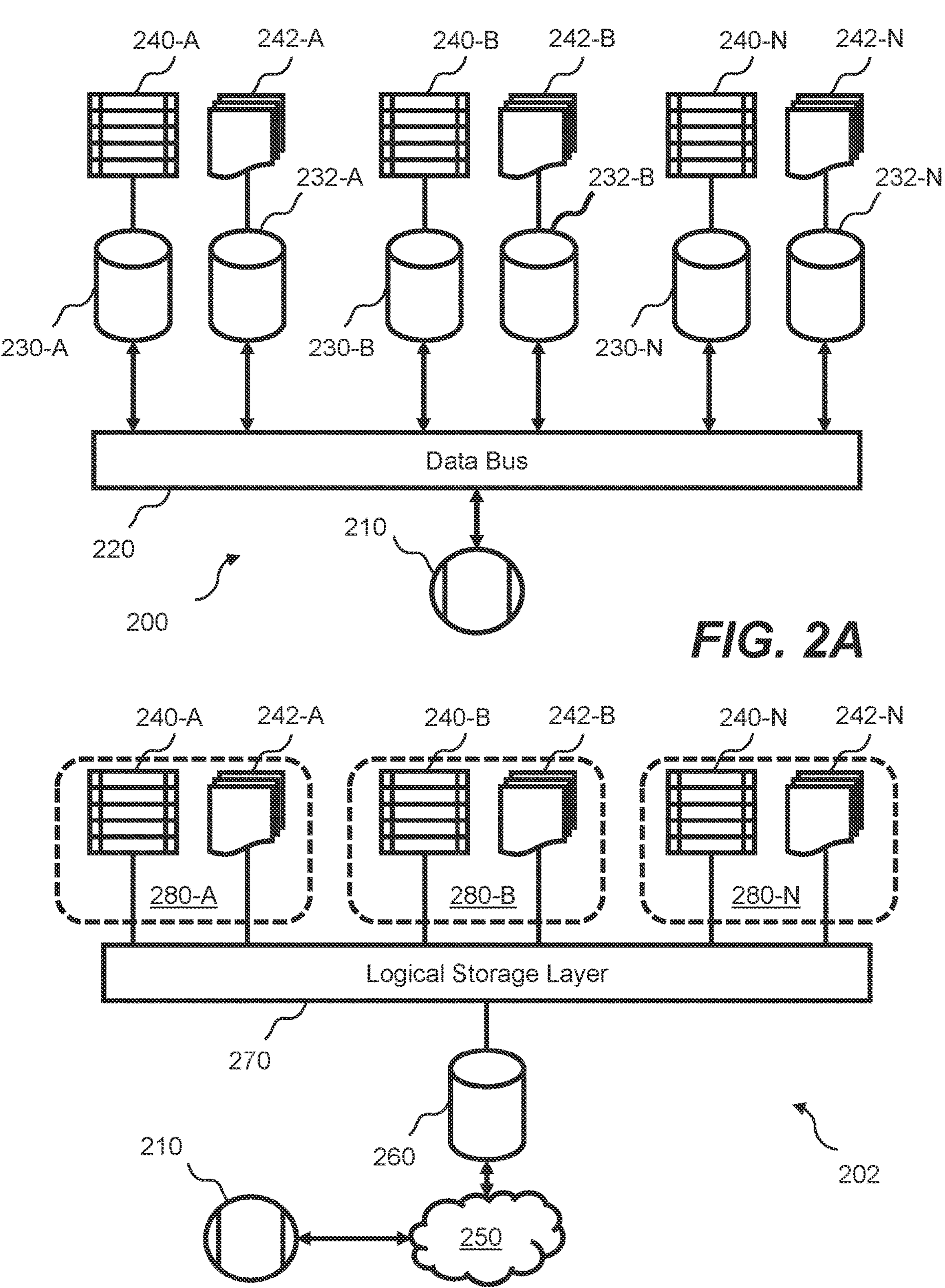
FIGS. 2A and 2B are schematic diagrams showing different examples of data storage systems for use by a machine learning transaction processing system.

FIGS. 2A and 2B show two example data storage configurations 200 and 202 that may be used by an example machine learning system 210 for the processing of transaction data. The examples of FIGS. 2A and 2B are two non-limiting examples that show different options available for implementations, and particular configurations may be selected according to individual circumstances. The machine learning system 210 may comprise an implementation of the machine learning system 160 described in the previous examples of FIGS. 1A to 1C. The examples of FIGS. 2A and 2B allow for the processing of transaction data that is secured using heterogeneous cryptographic parameters, e.g. for the machine learning system 210 to securely process transaction data for heterogeneous entities. It will be appreciated that the configurations of FIGS. 2A and 2B may not be used if the machine learning system 160 is implemented for a single set of secure transaction and ancillary data, e.g. within an internal transaction processing system or as a hosted system for use by a single payment processor.

FIG. 2A shows a machine learning system 210 communicatively coupled to a data bus 220. The data bus 220 may comprise an internal data bus of the machine learning server 150 or may form part of storage area network. The data bus 220 communicatively couples the machine learning system 210 to a plurality of data storage devices 230, 232. The data storage devices 230, 232 may comprise any known data storage device such as magnetic hard disks and solid-state devices. Although data storage devices 230, 232 are shown as different devices in FIG. 2A they may alternatively form different physical areas or portions of storage within a common data storage device. In FIG. 2A, the plurality of data storage devices 230, 232 store historical transaction data 240 and ancillary data 242. In FIG. 2A, a first set of data storage devices 230 store historical transaction data 240 and a second set of data storage devices 232 store ancillary data 242. Ancillary data 242 may comprise one or more of model parameters for a set of machine learning models (such as trained parameters for a neural network architecture and/or configuration parameters for a random forest model) and state data for those models. In one case, the different sets of historical transaction data 240-A to N and ancillary data 242-A to N are associated with different entities that are securely and collectively use services provided by the machine learning system 210, e.g. these may represent data for different banks that need to be kept separate as part of the conditions of providing machine learning services to those entities.

FIG. 2B shows another way different sets of historical transaction data 240-A to N and ancillary data 242-A to N may be stored. In FIG. 2B the machine learning system 210 is communicatively coupled, via data transfer channel 250, to at least one data storage device 260. The data transfer channel 250 may comprise a local storage bus, local storage area network, and/or remote secure storage coupling (e.g., as overlaid over insecure networks such as the Internet). In FIG. 2B, a secure logical storage layer 270 is provided using the physical data storage device 260. The secure logical storage layer 270 may be a virtualized system that appears as separate physical storage devices to the machine learning system 210 while actually being implemented independently upon the at least one data storage device 260. The logical storage layer 270 may provide separate encrypted partitions 280 for data relating to groups of entities (e.g., relating to different issuing banks etc.) and the different sets of historical transaction data 240-A to N and ancillary data 242-A to N may be stored in the corresponding partitions 280-A to N. In certain cases, entities may be dynamically created as transactions are received for processing based on data stored by one or more of the server systems shown in FIGS. 1A to 1C.

Example Transaction Data

Figure 3A:
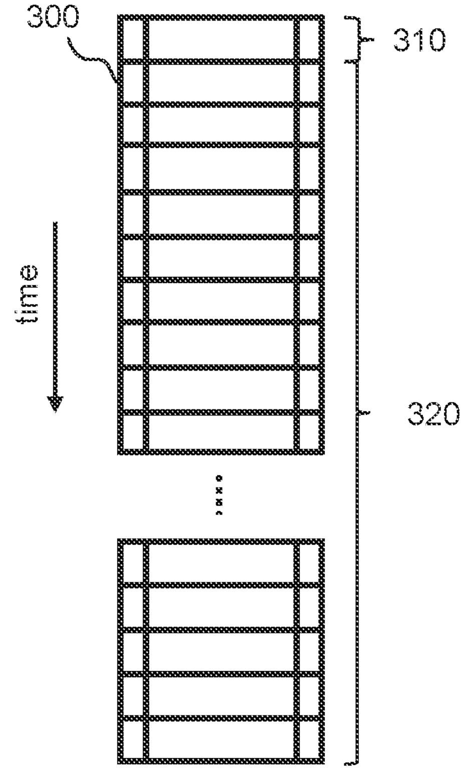
FIGS. 3A and 3B are schematic diagrams showing different examples of transaction data.
Figure 3B:
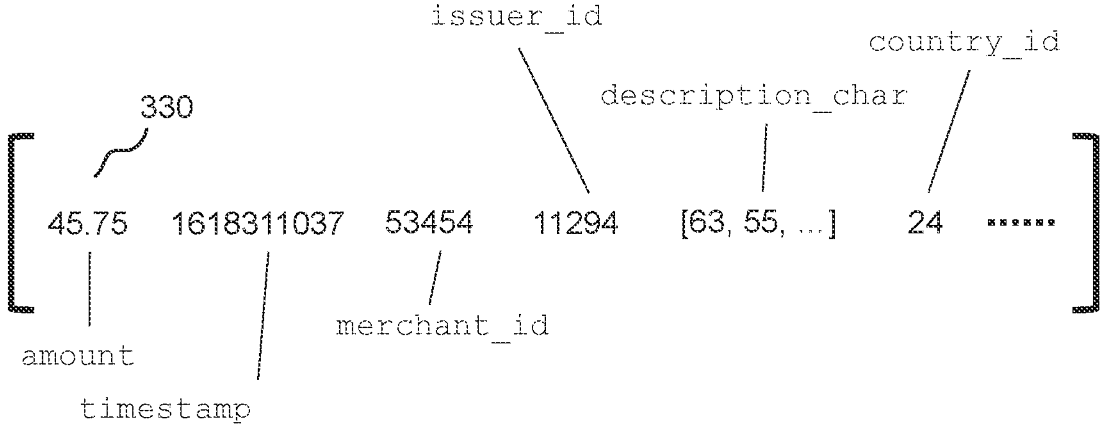

FIGS. 3A and 3B show examples of transaction data that may be processed by a machine learning system such as 160 or 210. FIG. 3A shows how transaction data may comprise a set of time-ordered records 300, where each record has a timestamp and comprises a plurality of transaction fields. In certain cases, transaction data may be grouped and/or filtered based on the timestamp. For example, FIG. 3A shows a partition of transaction data into current transaction data 310 that is associated with a current transaction and "older" or historical transaction data 320 that is within a predefined time range of the current transaction. The time range may be set as a hyperparameter of any machine learning system. Alternatively, the "older" or historical transaction data 320 may be set as a certain number of transactions. Mixtures of the two approaches are also possible.

FIG. 3B shows how transaction data 330 for a particular transaction may be stored in numeric form for processing by one or more machine learning models. For example, in FIG. 3B, transaction data has at least fields: transaction amount, timestamp (e.g., as a Unix epoch), transaction type (e.g., card payment or direct debit), product description or identifier (i.e., relating to items being purchased), merchant identifier, issuing bank identifier, a set of characters (e.g., Unicode characters within a field of predefined character length), country identifier etc. It should be noted that a wide variety of data types and formats may be received and pre-processed into appropriate numerical representations. In certain cases, originating transaction data, such as that generated by a client device and sent to merchant server 130 is pre-processed to convert alphanumeric data types to numeric data types for the application of the one or more machine learning models. Other fields present in the transaction data can include, but are not limited to, an account number (e.g., a credit card number), a location of where the transaction is occurring, and a manner (e.g., in person, over the phone, on a website) in which the transaction is executed.

Example Machine Learning System

Figure 4:
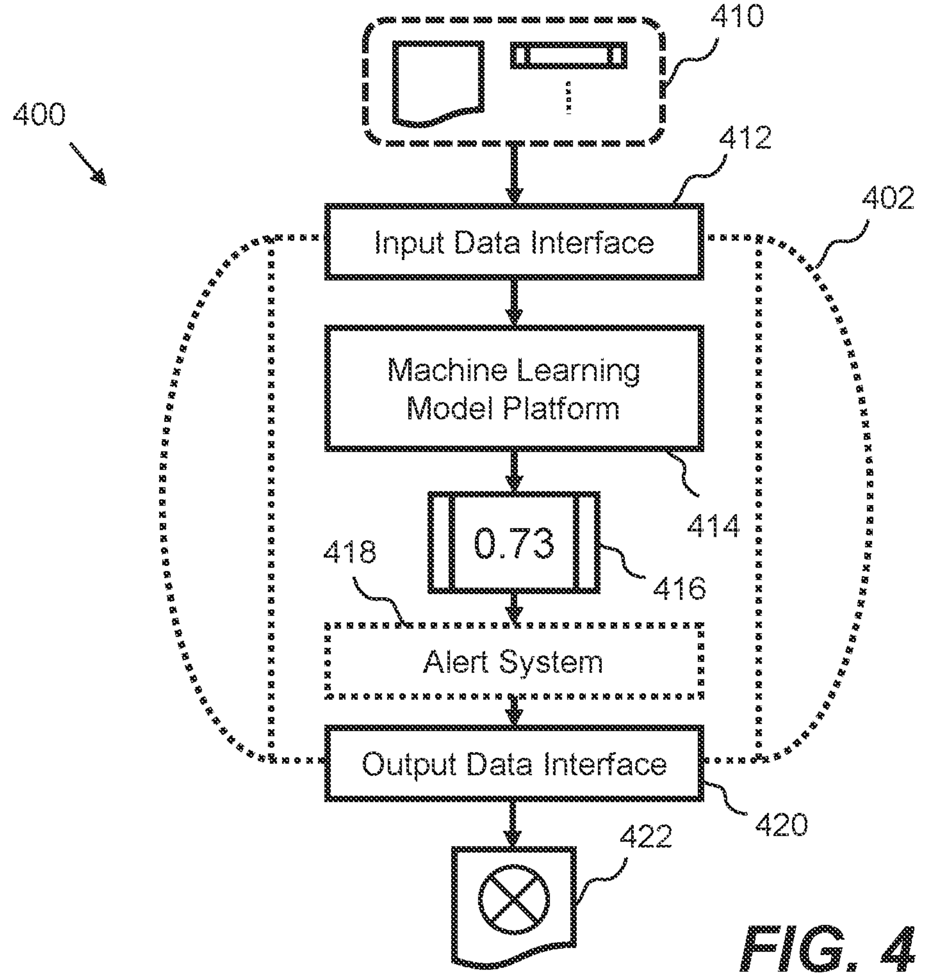
FIG. 4 is a schematic diagram showing example components of a machine learning transaction processing system.

FIG. 4 shows one example 400 of a machine learning system 402 that may be used to process transaction data. Machine learning system 402 may implement one or more of machine learning systems 160 and 210. The machine learning system 402 receives input data 410. The form of the input data 410 may depend on which machine learning model is being applied by the machine learning system 402. In a case where the machine learning system 402 is configured to perform fraud or anomaly detection in relation to a transaction, e.g. a transaction in progress as described above, the input data 410 may comprise transaction data such as 330 (i.e., data forming part of a data package for the transaction) as well as data derived from historical transaction data (such as 300 in FIG. 3A) and/or data derived from ancillary data (such as 148 in FIGS. 1A to 1C or 242 in FIGS. 2A and 2B). The ancillary data may comprise secondary data linked to one or more entities identified in the primary data associated with the transaction. For example, if transaction data for a transaction in progress identifies a user, merchant and one or more banks associated with the transaction (such as an issuing bank for the user and a merchant bank), such as via unique identifiers present in the transaction data, then the ancillary data may comprise data relating to these transaction entities. The ancillary data may also comprise data derived from records of activity, such as interaction logs and/or authentication records. In one case, the ancillary data is stored in one or more static data records and is retrieved from these records based on the received transaction data. Additionally, or alternatively, the ancillary data may comprise machine learning model parameters that are retrieved based on the contents of the transaction data. For example, machine learning models may have parameters that are specific to one or more of the user, merchant and issuing bank, and these parameters may be retrieved based on which of these is identified in the transaction data. For example, one or more of users, merchants, and issuing banks may have corresponding embeddings, which may comprise retrievable or mappable tensor representations for said entities. For example, each user or merchant may have a tensor representation (e.g., a floating-point vector of size 128-1024) that may either be retrieved from a database or other data storage or may be generated by an embedding layer, e.g. based on a user or merchant index.

The input data 410 is received at an input data interface 412. The input data interface 412 may comprise an API interface, such as an internal or external API interface as described above. This API interface is also referred to as the 'EventAPI' with reference to FIGS. 6 to 8 later.

In one case, the payment processor server 140 as shown in FIGS. 1A to 1C makes a request to this interface, where the request payload contains the transaction data. The API interface may be defined to be agnostic as to the form of the transaction data or its source. The input data interface 412 is communicatively coupled to a machine learning model platform 414. In one case, a request made to the input data interface 412 triggers the execution of the machine learning model platform 414 using the transaction data supplied to the interface. The machine learning model platform 414 is configured as an execution environment for the application of one or more machine learning models to the input data 410. In one case, the machine learning model platform 414 is arranged as an execution wrapper for a plurality of different selectable machine learning models. For example, a machine learning model may be defined using a model definition language (e.g., similar to, or using, markup languages such as extended Markup Language—XML). Model definition languages may include (amongst others, independently or in combination), SQL, TensorFlow, Caffe, Thinc and PyTorch. In one case, the model definition language comprises computer program code that is executable to implement one or more of training and inference of a defined machine learning model. The machine learning models may, for example, comprise, amongst others, artificial neural network architectures, ensemble models, regression models, decision trees such as random forests, graph models, and Bayesian networks. The machine learning model platform 414 may define common (i.e., shared) input and output definitions such that different machine learning models are applied in a common (i.e., shared) manner.

In the present example, the machine learning model platform 414 is configured to provide at least a single scalar output 416. This may be normalised within a predefined range, such as 0 to 1. When normalised, the scalar output 416 may be seen as a probability that a transaction associated with the input data 410 is fraudulent or anomalous. In this case, a value of "0" may represent a transaction that matches normal patterns of activity for one or more of a user, merchant and issuing bank, whereas a value of "1" may indicate that the transaction is fraudulent or anomalous, i.e. does not match expected patterns of activity (although those skilled in the art will be aware that the normalised range may differ, such as be inverted or within different bounds, and have the same functional effect). It should be noted that although a range of values may be defined as 0 to 1, output values may not be uniformly distributed within this range, for example, a value of "0.2" may be a common output for a "normal" event and a value of "0.8" may be seen as being over a threshold for a typical "anomalous" or fraudulent event. The machine learning model implemented by the machine learning platform 414 may thus implement a form of mapping between high-dimensionality input data (e.g., the transaction data and any retrieve ancillary data) and a single value output. In one case, for example, the machine learning platform 414 may be configured to receive input data for the machine learning model in a numeric format, wherein each defined machine learning model is configured to map input data defined in the same manner. The exact machine learning model that is applied by the machine learning model platform 414, and the parameters for that model, may be determined based on configuration data. The configuration data may be contained within, and/or identified using, the input data 410 and/or may be set based on one or more configuration files that are parsed by the machine learning platform 414.

In certain cases, the machine learning model platform 414 may provide additional outputs depending on the context. In certain implementations, the machine learning model platform 414 may be configured to return a "reason code" capturing a human-friendly explanation of a machine learning model's output in terms of suspicious input attributes. For example, the machine learning model platform 414 may indicate which of one or more input elements or units within an input representation influenced the model output, e.g. a combination of an "amount" channel being above a learnt threshold and a set of "merchant" elements or units (such as an embedding or index) being outside a given cluster. In cases, where the machine learning model platform 414 implements a decision tree, these additional outputs may comprise a route through the decision tree or an aggregate feature importance based on an ensemble of trees. For neural network architectures, this may comprise layer output activations and/or layer filters with positive activations.

In FIG. 4, certain implementations may comprise an optional alert system 418 that receives the scalar output 416. In other implementations, the scalar output 416 may be passed directly to an output data interface 420 without post processing. In this latter case, the scalar output 416 may be packaged into a response to an original request to the input data interface 412. In both cases, output data 422 derived from the scalar output 416 is provided as an output of the machine learning system 402. The output data 422 is returned to allow final processing of the transaction data. For example, the output data 422 may be returned to the payment processor server 140 and used as the basis of a decision to approve or decline the transaction. Depending on implementation requirements, in one case, the alert system 418 may process the scalar output 416 to return a binary value indicating whether the transaction should be approved or declined (e.g., "1" equals decline). In certain cases, a decision may be made by applying a threshold to the scalar output 416. This threshold may be context dependent. In certain cases, the alert system 418 and/or the output data interface 420 may also receive additional inputs, such as explanation data (e.g., the "reason code" discussed above) and/or the original input data. The output data interface 420 may generate an output data package for output data 422 that combines these inputs with the scalar output 416 (e.g., at least for logging and/or later review). Similar, an alert generated by the alert system 418 may include and/or be additionally based on the aforementioned additional inputs, e.g. in addition to the scalar output 416.

The machine learning system 402 is typically used in an "online" mode to process a high volume of transactions within a narrowly defined time range. For example, in normal processing conditions the machine learning system 402 may process requests within 7-12 ms and be able to manage 1000-2000 requests a second (these being median constraints from real-world operating conditions). However, the machine learning system 402 may also be used in an "offline" mode, e.g. by providing a selected historical transaction to the input data interface 412. In an offline mode, input data may be passed to the input data interfaces in batches (i.e., groups). The machine learning system 402 may also be able to implement machine learning models that provide a scalar output for an entity as well as, or instead of, a transaction. For example, the machine learning system 402 may receive a request associated with an identified user (e.g., a card or payment account holder) or an identified merchant and be arranged to provide a scalar output 416 indicating a likelihood that the user or merchant is fraudulent, malicious, or anomalous (i.e., a general threat or risk). For example, this may form part of a continuous or periodic monitoring process, or a one-off request (e.g., as part of an application for a service). The provision of a scalar output for a particular entity may be based on a set of transaction data up to and including a last approved transaction within a sequence of transaction data (e.g., transaction data for an entity similar to that should in FIG. 3A).

As will be explained later, both 'live' and 'batch' data may be received and used by the machine learning system. These may be received by the same set of EventAPIs with different REST endpoints, or a different set of EventAPIs dedicated to reading batch data from another source. Additionally or alternatively, EventAPIs may read events from another source (rather than receiving them via REST), e.g. by reading them from a comma-separated values (CSV) file or any other suitable file format.

Example Transaction Process Flow

Figure 5A:
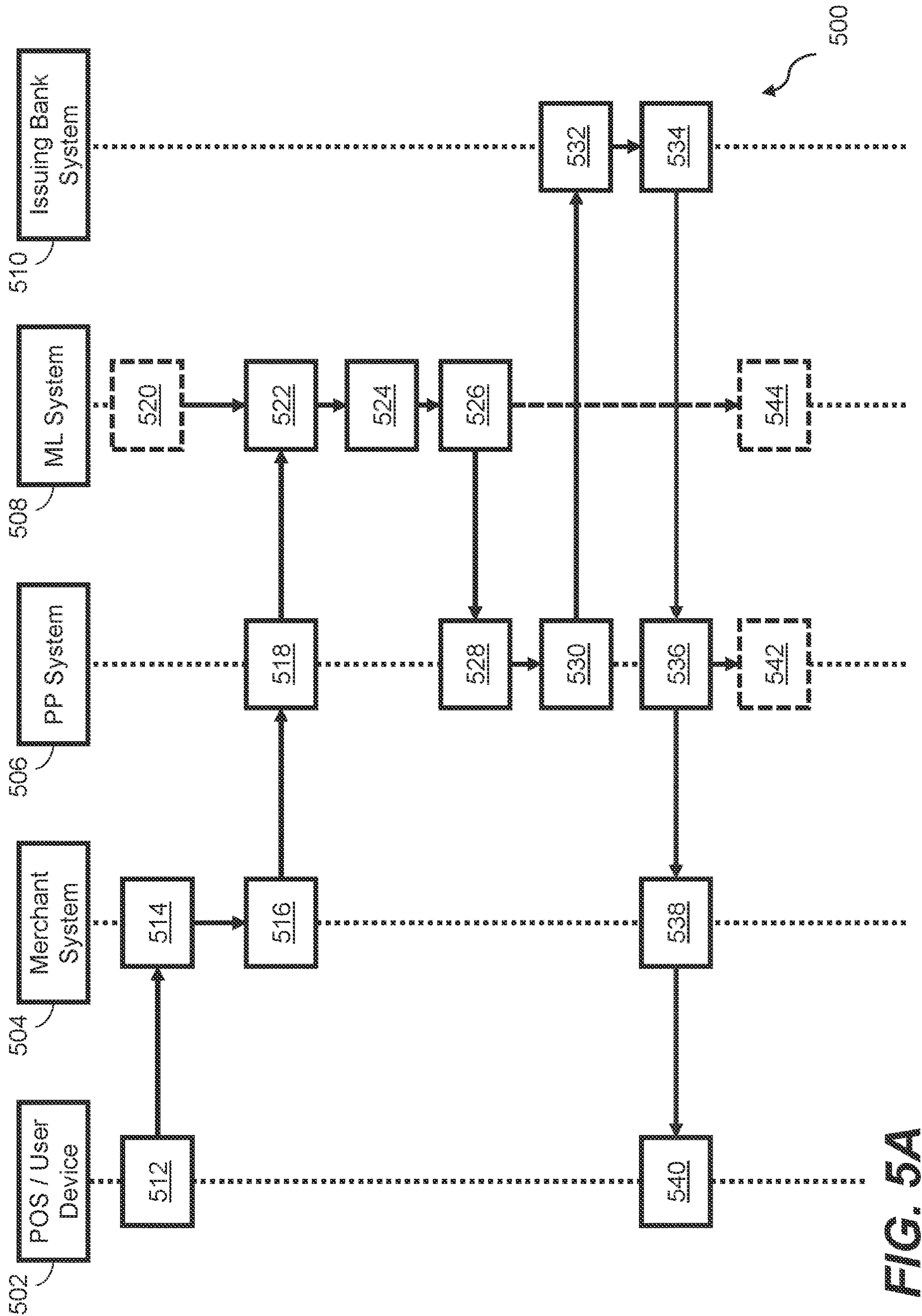
FIGS. 5A and 5B are sequence diagrams showing an example set of processes performed by different computing entities on transaction data.
Figure 5B:
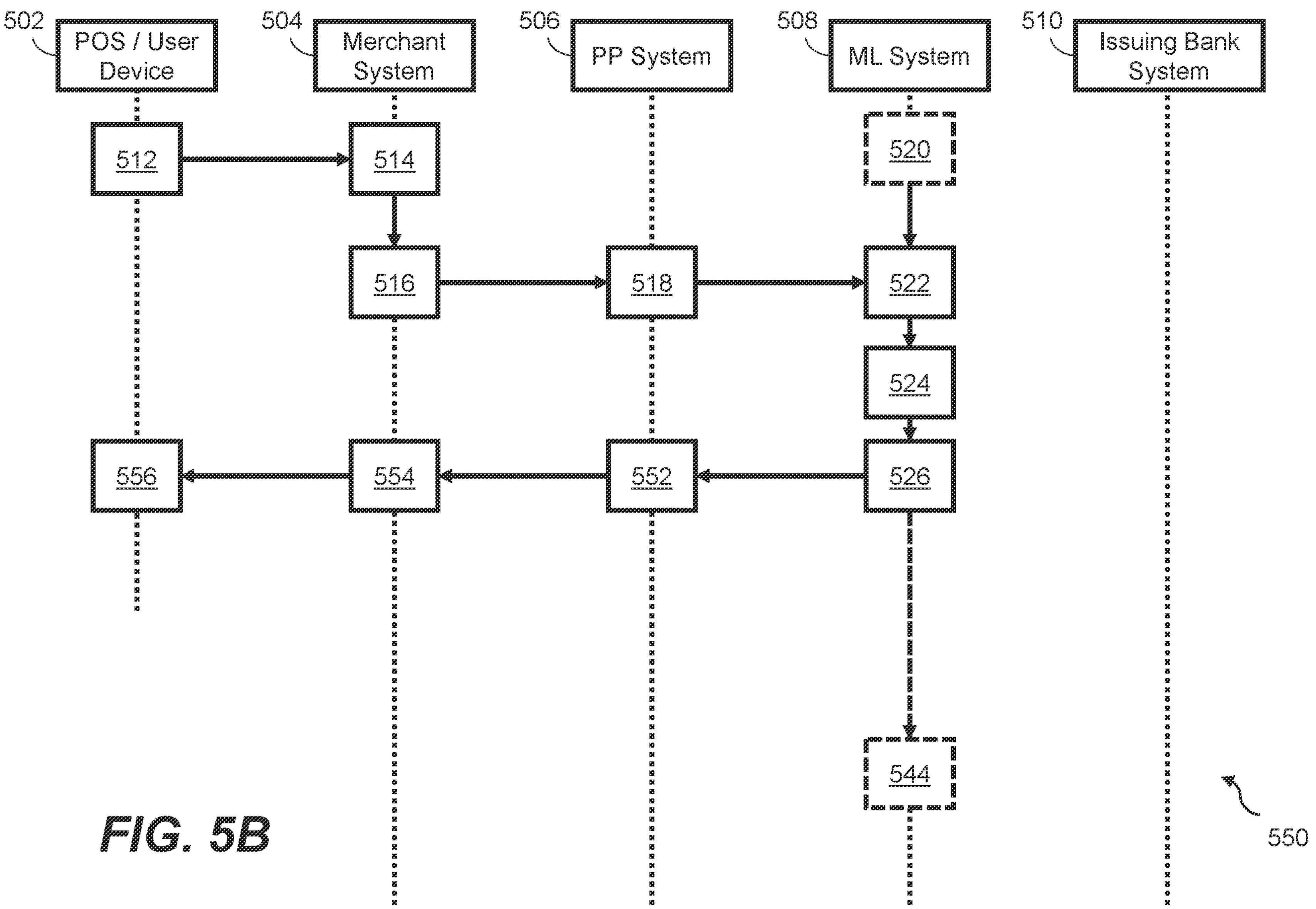

FIGS. 5A and 5B show two possible example transaction process flows 500 and 550. These process flows may take place in the context of the example transaction process systems 100, 102, 104 shown in FIGS. 1A to 1C as well as other systems. The process flows 500 and 550 are provided as one example of a context in which a machine learning transaction processing system may be applied, however not all transaction process flows will necessarily follow the processes shown in FIGS. 5A and 5B and process flows may change between implementations, systems and over time. The example transaction process flows 500 and 550 reflect two possible cases: a first case represented by transaction process flow 500 where a transaction is approved, and a second case represented by transaction process flow 550 where a transaction is declined. Each transaction process flow 500, 550 involves the same set of five interacting systems and devices: a POS or user device 502, a merchant system 504, a payment processor (PP) system 506, a machine learning (ML) system 508 and an issuing bank system 510. The POS or user device 502 may comprise one of the client devices 110, the merchant system 504 may comprise the merchant server 130, the payment processor system 506 may comprise the payment processor server 140, and the machine learning system 508 may comprise an implementation of the machine learning system 160, 210 and/or 402. The issuing bank system 510 may comprise one or more server devices implementing transaction functions on behalf of an issuing bank. The five interacting systems and devices 502 to 510 may be communicatively coupled by one or more internal or external communication channels, such as networks 120. In certain cases, certain ones of these systems may be combined, e.g. an issuing bank may also act as a payment processor and so systems 506 and 510 may be implemented with a common system. In other cases, a similar process flow may be performed specifically for a merchant (e.g., without involving a payment processor or issuing bank). In this case, the machine learning system 508 may communicate directly with the merchant system 504. In these variations, a general functional transaction process flow may remain similar to that described below.

The transaction process flow in both FIGS. 5A and 5B comprises a number of common (i.e., shared) processes 512 to 528. At block 512, the POS or user device 502 initiates a transaction. For a POS device, this may comprise a cashier using a front-end device to attempt to take an electronic payment; for a user device 502 this may comprise a user making an online purchase (e.g., clicking "complete" within an online basket) using a credit or debit card, or an online payment account. At block 514, the payment details are received as electronic data by the merchant system 504. At block 516, the transaction is processed by the merchant system 504 and a request is made to the payment processor system 506 to authorise the payment. At block 518, the payment processor system 506 receives the request from the merchant system 504. The request may be made over a proprietary communications channel or as a secure request over public networks (e.g., an HTTPS request over the Internet). The payment processor system 506 then makes a request to the machine learning system 508 for a score or probability for use in processing the transaction. Block 518 may additional comprise retrieving ancillary data to combine with the transaction data that is sent as part of the request to the machine learning system 508. In other cases, the machine learning system 508 may have access to data storage devices that store ancillary data (e.g., similar to the configurations of FIGS. 2A and 2B) and so retrieve this data as part of internal operations (e.g., based on identifiers provided within the transaction data and/or as defined as part of an implemented machine learning model).

Block 520 shows a model initialisation operation that occurs prior to any requests from the payment processor system 506. For example, the model initialisation operation may comprise loading a defined machine learning model and parameters that instantiate the defined machine learning model. At block 522, the machine learning system 508 receives the request from the payment processor system 506 (e.g., via a data input interface such as 412 in FIG. 4). At block 522, the machine learning system 508 may perform any defined pre-processing prior to application of the machine learning model initialised at block 520. For example, in the case that the transaction data still retains character data, such as a merchant identified by a character string or a character transaction description, this may be converted into suitable structured numeric data (e.g., by converting string categorical data to an identifier via a look-up operation or other mapping, and/or by mapping characters or groups of characters to vector embeddings). Then at block 524 the machine learning system 506 applies the instantiated machine learning model, supplying the model with input data derived from the received request. This may comprise applying the machine learning model platform 414 as described with reference to FIG. 4. At block 526, a scalar output is generated by the instantiated machine learning model. This may be processed to determine an "approve" or "decline" binary decision at the machine learning system 508 or, in a preferred case, is returned to the payment processor system 506 as a response to the request made at block 518.

At block 528, the output of the machine learning system 508 is received by the payment processor system 506 and is used to approve or decline the transaction. FIG. 5A shows a process where the transaction is approved based on the output of the machine learning system 508; FIG. 5B shows a process where the transaction is declined based on the output of the machine learning system 508. In FIG. 5A, at block 528, the transaction is approved. Then at block 530, a request is made to the issuing bank system 532. At block 534, the issuing bank system 532 approves or declines the request. For example, the issuing bank system 532 may approve the request if an end user or card holder has sufficient funds and approval to cover the transaction cost. In certain cases, the issuing bank system 532 may apply a second level of security; however, this may not be required if the issuing bank relies on the anomaly detection performed by the payment processor using the machine learning system 508. At block 536, the authorisation from the issuing bank system 510 is returned to the payment processor system 506, which in turn sends a response to the merchant system 504 at block 538, and the merchant system 504 in turn responds to the POS or user device 502 at block 540. If the issuing bank system 510 approves the transaction at block 534, then the transaction may be completed, and a positive response returned via the merchant system 504 to the POS or user device 502. The end user may experience this as an "authorised" message on screen of the POS or user device 502. The merchant system 504 may then complete the purchase (e.g., initiate internal processing to fulfil the purchase).

At a later point in time, one or more of the merchant system 504 and the machine learning system 508 may save data relating to the transaction, e.g. as part of transaction data 146, 240 or 300 in the previous examples. This is shown at dashed blocks 542 and 544. This process is carried out by the updaters 614, 714, 814 described below with reference to FIGS. 6 to 8.

The transaction data may be saved along with one or more of the output of the machine learning system 508 (e.g., the scalar fraud or anomaly probability) and a final result of the transaction (e.g., whether it was approved or declined). The saved data may be stored for use as training data for the machine learning models implemented by the machine learning system 508.

The saved data may also be accessed as part of future iterations of block 524, e.g. may form part of future ancillary data. In certain cases, a final result or outcome of the transaction may not be known at the time of the transaction. For example, a transaction may only be labelled as anomalous via later review by an analyst and/or automated system, or based on feedback from a user (e.g., when the user reports fraud or indicates that a payment card or account was compromised from a certain date). In these cases, ground truth labels for the purposes of training the machine learning system 508 may be collected over time following the transaction itself.

Turning now to the alternative process flow of FIG. 5B, in this case one or more of the machine learning system 508 and the payment processor system 506 declines the transaction based on the output of the machine learning system 508. For example, a transaction may be declined if the scalar output of the machine learning system 508 is above a retrieved threshold. At block 552, the payment processor system 506 issues a response to the merchant system 504, which is received at block 554. At block 554, the merchant system 504 undertakes steps to prevent the transaction from completing and returns an appropriate response to the POS or user device 502. This response is received at block 556 and an end user or customer may be informed that their payment has been declined, e.g. via a "Declined" message on screen. The end user or customer may be prompted to use a different payment method. Although not shown in FIG. 5B, in certain cases, the issuing bank system 510 may be informed that a transaction relating to a particular account holder has been declined. The issuing bank system 510 may be informed as part of the process shown in FIG. 5B or may be informed as part of a periodic (e.g., daily) update. Although, the transaction may not become part of transaction data 146, 240 or 300 (as it was not approved), it may still be logged by at least the machine learning system 508 as indicated by block 544. For example, as for FIG. 5A, the transaction data may be saved along with the output of the machine learning system 508 (e.g., the scalar fraud or anomaly probability) and a final result of the transaction (e.g., that it was declined).

Figure 6:
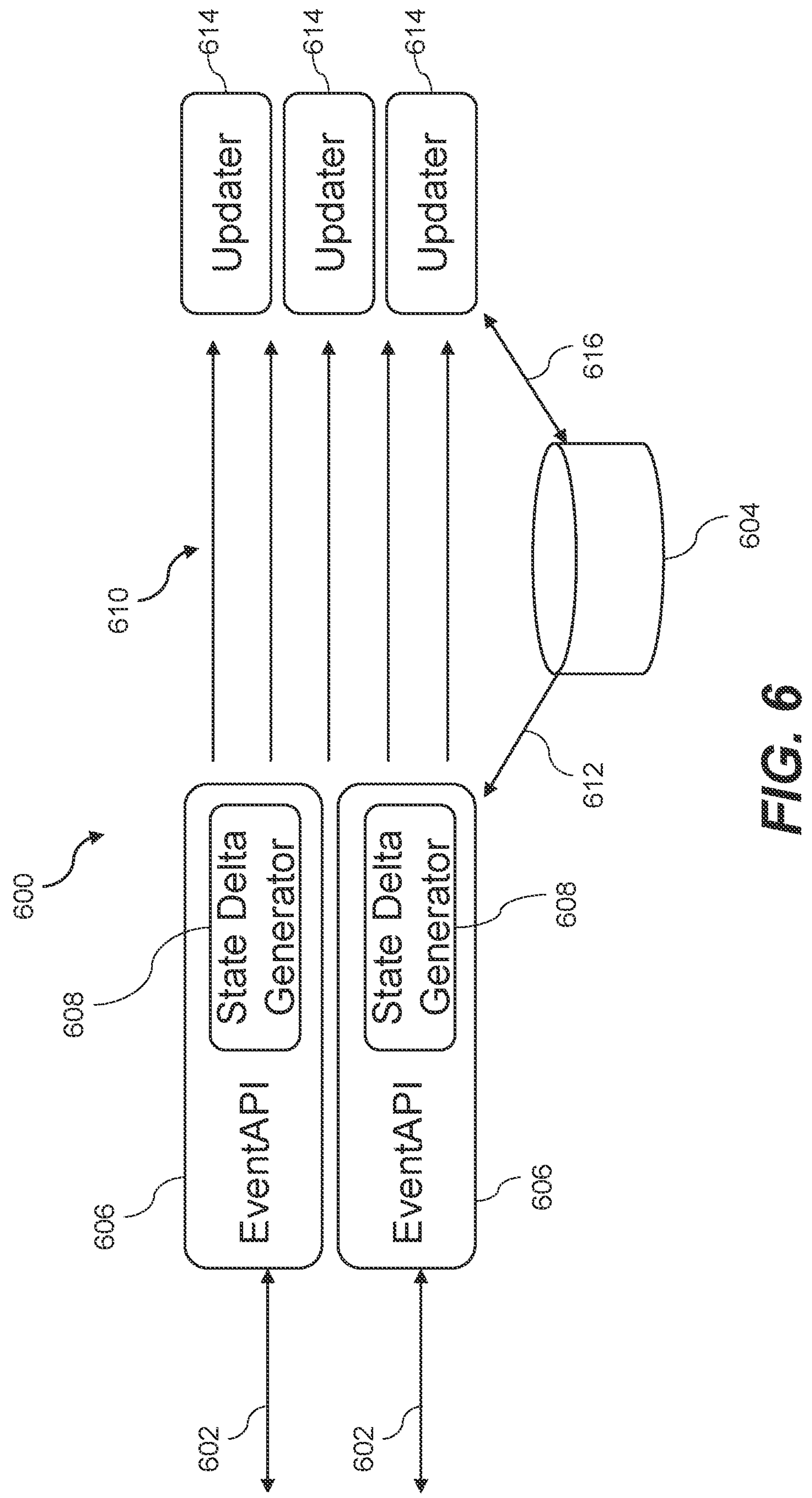
FIG. 6 is a block diagram illustrating an exemplary machine learning system for processing incoming event data.

FIG. 6 is a block diagram illustrating a machine learning system 600 for processing incoming event data 602 associated with a transaction.

The system has a database 604 which is configured to store state data, this database being stored in a first memory store which may (by way of example only) be on any suitable magnetic or solid-state storage device.

The system uses several Event APIs 606 (two are shown in FIG. 6 but there may be greater or fewer of these), each of which contains a state delta generator 608 which is configured to generate state deltas 610 with pending updates to the state data for later application (see below). Each state delta generator 608 may retrieve the most recent version of the state data 612 from the database 604 as well as a particular input of incoming event data 602.

Each state delta generator 608 applies one or more machine learning models and/or adaptive rulesets to process the respective incoming event data 602 and the retrieved version of the state data 612. The result of this processing is the generation of an event state delta 610 which includes one or more updates to be made to the state data following the latest operation. The operation of the state delta generator 608 is 'synchronous', i.e. it processes the event data associated with the transactions 'live' as it is received.

The state deltas 610 with pending updates are added to a queue to be processed by an updater 614, which generates updated state data 616 and saves it to the database 604. The operation of the updater 614 is 'asynchronous', i.e. it is carried out at suitable times, but not necessarily live in response to the event data 602 being received. The updates may be carried out according to some particular schedule, in response to a threshold number of state deltas being in the queue, in response to a certain amount of event data having been received, in response to an instruction from an external system, or any other such suitable trigger.

Figure 7:
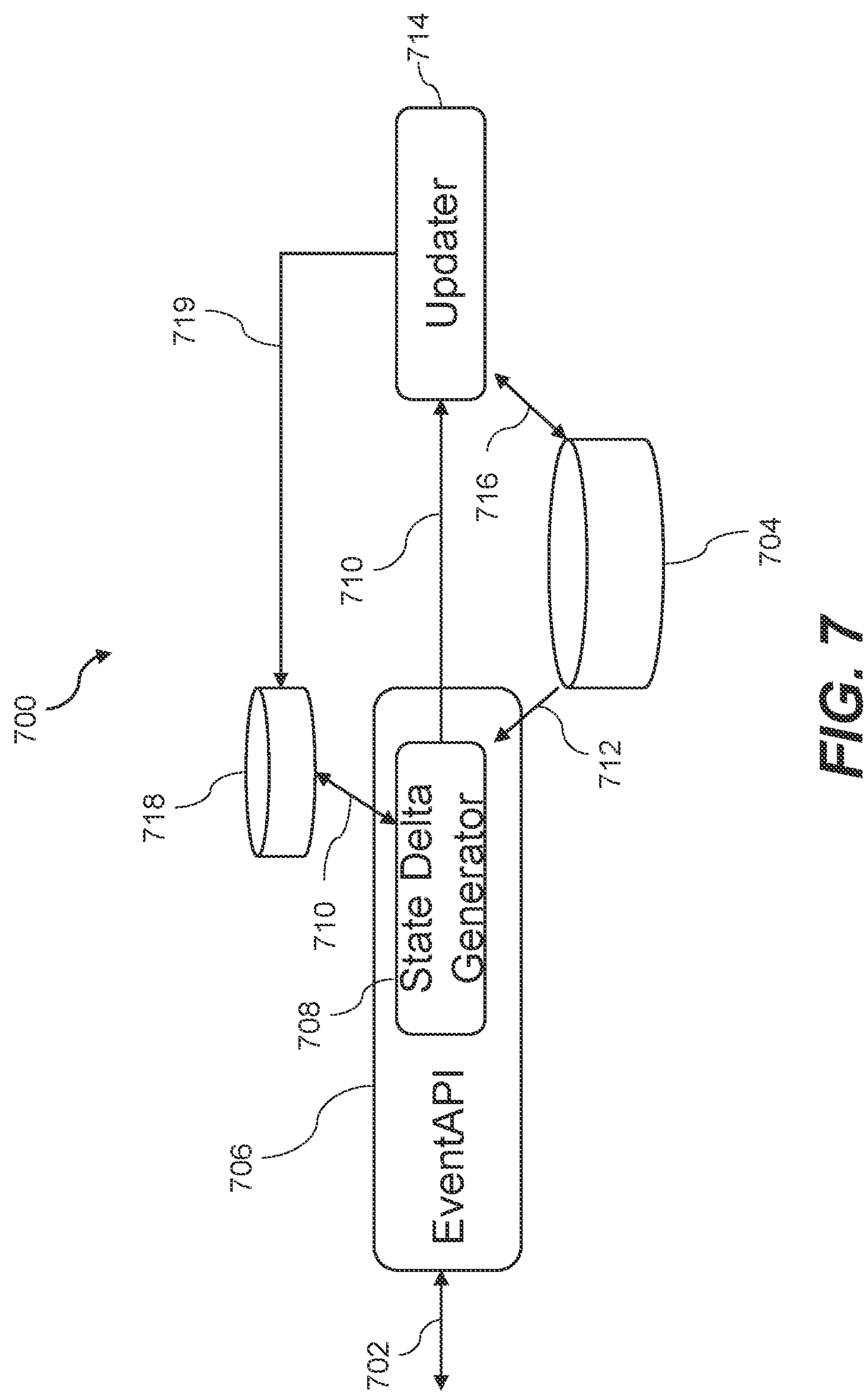
FIG. 7 is a block diagram illustrating an exemplary machine learning system for processing incoming event data in which copies of state deltas are stored in a cache in accordance with an embodiment of the present invention.

FIG. 7 is a block diagram illustrating a machine learning system 700 for processing incoming event data. The state delta generator 708 and the updater 714 may be instantiated within the machine learning model platform 414 previously described with reference to FIG. 4.

It will be appreciated that elements have reference numerals beginning with a '7' in FIG. 7 correspond in form and function to those elements having corresponding reference numerals beginning with a '6' in FIG. 6 unless context dictates otherwise.

It will be appreciated that, for the sake of simplicity, FIG. 7 shows only a single state delta generator 708 and a single updater 714, however in practice multiple of one or both of these components may be used, which may share the database 704 and cache 718 with those illustrated in FIG. 7.

In general, all EventAPIs may share the same cache such that events with the same entity can be processed by multiple EventAPIs at the same time. Similarly, multiple state delta can be put in the cache at the same time for the same entity. If, on the other hand, the events are instead processed consecutively, the second event will see the state delta updates from the first event (because when the state data is read, the state delta from the first event will be returned from the cache alongside the state data from the database), even if they're in different EventAPIs.

The state delta generator 708 runs inside the EventAPI 706 (which may be the input data interface 412 described previously with reference to FIG. 4). It will be appreciated, however, that the architecture shown in FIG. 7 is exemplary and in practice, the state delta generator 708 may exist as a separate daemon to that of the EventAPI 706, for example with the state delta generator 708 communicating with the EventAPI 706 using a remote procedure call (RPC) or representational state transfer (REST) function.

For each event 702, the state delta generator 708 reads the entity state 712 from the database 704 and passes these through the models (e.g. machine learning models such as those described hereinabove) to generate an engine response. It also calculates the state updates each model wants to apply to each entity-partition as a state delta 710, and puts the state delta 710 onto the appropriate Kafka® topic, which, in this particular example, is partitioned by entity & state id. It will be appreciated that the Kafka® topics that are used to implement the queue may be partitioned by entity id, a mixture of the entity id and other identifiers, or in accordance with any other suitable identification scheme that allows for distinct state data in the database to be pointed to.

In the arrangement of FIG. 7, in addition to the state deltas 710 with pending state updates being held in the queue for processing by the updater 714, copies of these state deltas 710 are also stored in a separate cache 718.

The cache 718 is held by a second memory store, which is separate to the first memory store that holds the database 704. The second memory store may be (by way of example only) any suitable magnetic or solid-state storage device. Typically the cache 718 is random access, i.e. its various memory locations can be written to and read from in any arbitrary order, rather than needing them to be accessed in sequence.

If and when requests are received by the system 700 for access to the state data stored in the database 704 (e.g. requests from the state delta generator 708 or some external component, not shown), the system 700 queries the cache to determine if there are any state deltas 710 that are applicable to the version of the state data 712 it intends to return from the database 704. If such state deltas 710 exist in the cache 718, these are returned along with the state data 712 from the database 704. This ensures that the recipient has an up-to-date version of the state data, thereby minimising and potentially eliminating altogether the state lag issues that otherwise arise by making use of state delta-based processing in this way.

As per the arrangement of FIG. 7, the only output of the engine is from the state delta generators 708 inside the EventAPIs 706. This means that, by default, the state lag will be the time it takes the updaters 714 to read the state delta update 710 from the queue and apply it to the database 704 (i.e. to store the updated state data 716) which may, for example, potentially be several seconds depending on load. However, because all state updates are now done using state deltas 710, the pending state deltas 710 that have not been added to the database 704 can be stored in the separate state delta cache 718.

The cache 718 stores state deltas 710 that have not yet been applied to the entity database 704 state, keyed on the entity-partition and a 'generation id' indicating the version of the state data database 704 the state deltas 710 should be applied to. When the cache 718 is being used, as well as the state delta update being put onto the Kafka® queue, the state delta generator 708 would also add the state delta 710 to a list in the cache 718 for that particular partition-entity and generation that was read. Then, when reading entity state from the database 704, the state delta generators 708 would also read any pending state deltas 710 from the cache 718 that are applicable to the version of the state data read from the database 704, and apply them to the database state before passing the state to the models for processing.

This cache 718 could either be implemented using a separate process, like Redis®, or an integrated part of the EventAPIs 706.

When the updaters 714 update the state in the database 704, the updated state data 716 for the entity is written to the database 704 with an incremented generation id, and the updater 714 then issues a clear command 719 to the cache 718 which clears all entries in the cache 718 for that partition-entity with a lower generation id.

The approach outlined above may generally result in a state lag of a few tens of milliseconds, as determined by the time it takes for a generator 708 to put the state delta 710 in the cache 718. The increased overheads in managing the cache 718 and storing the state delta 710 in that cache come at the cost of increased resource usage and sync latency, but this is advantageously traded off against the significant reductions in state lag.

The use of the cache 718 to store copies of the state deltas 710 may also provide significant leeway in handling failures. Specifically, if the updaters 714 go down, either due to a failure in the daemons or another component, then the EventAPI 706 nodes can continue to read & respond to events 702, with state lag slack taken up by the state delta cache 718 (up to a point). When the updaters 714 come back up, they will catch up the pending updates on the state delta updater queue and clear out the state delta cache 718 as they go.

In this configuration, the (synchronous) state delta generator 708 and the (asynchronous) updater 714 are joined together by a partitioned Kafka® topic.

The updater 714 runs as a set of standalone daemons, implemented as a Kafka® consumer. They would read the state delta updates 710 from their assigned Kafka® partitions, read the state from the database 704, apply the state delta updates 710 to the state, and write it back to the database.

All of the daemons operate independently and do not need to communicate with each other. Instead, these daemons communicate only with Kafka® via the producer & consumer interfaces, and all the distribution is handled by Kafka® consumer groups.

Figure 8:
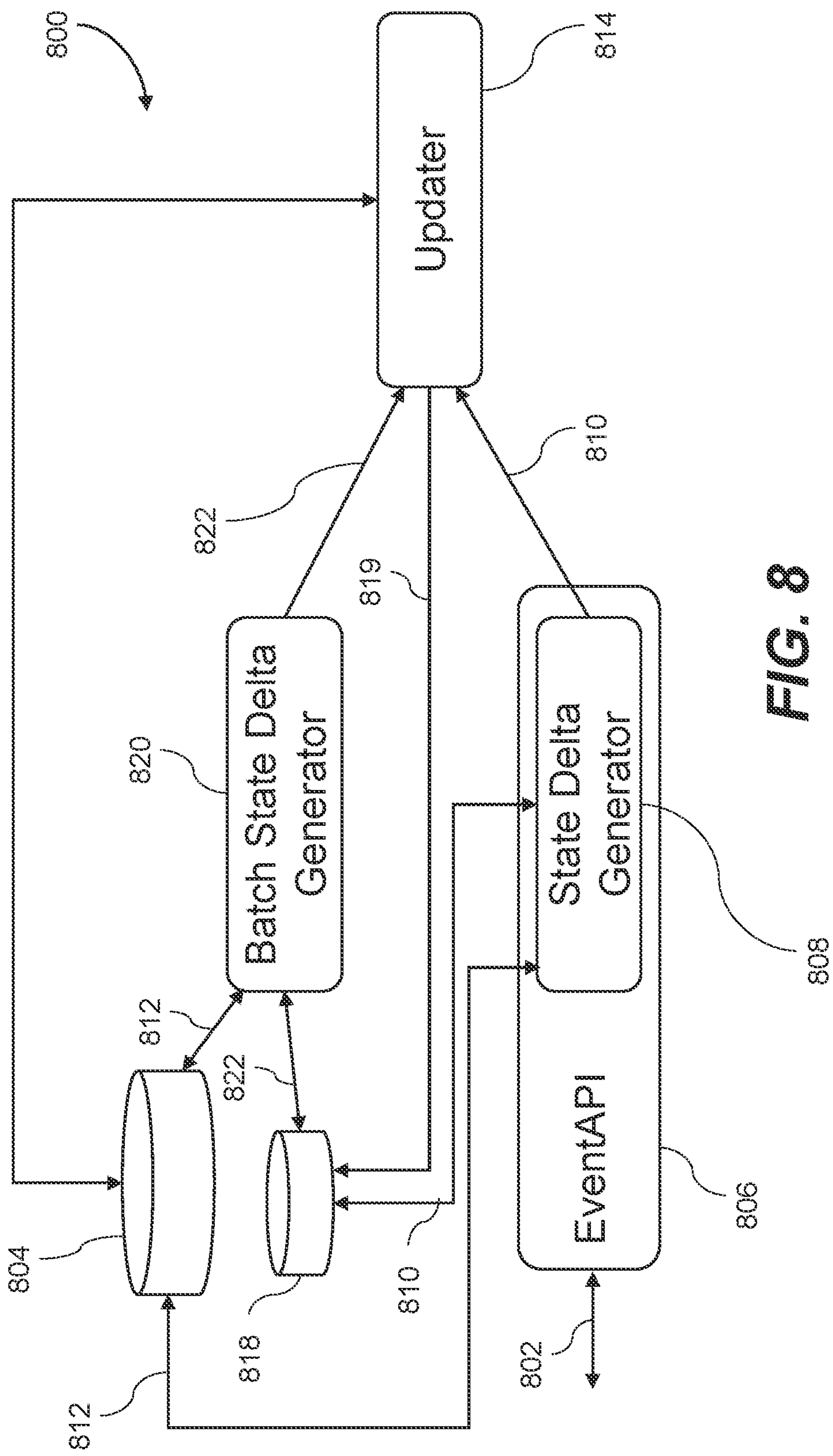
FIG. 8 is a block diagram illustrating an exemplary machine learning system that makes use of state deltas for live and batch events.

FIG. 8 is a block diagram illustrating a machine learning system 800 that makes use of state deltas for live and batch events. The separation between the state delta generators 808 and the updaters 814 allows another optional feature. The state deltas 810, 822 that sent to the updaters 818 do not necessarily have to (exclusively) come from the state delta generators 808 in the EventAPIs 806.

It will be appreciated that elements have reference numerals beginning with a '8' in FIG. 8 correspond in form and function to those elements having corresponding reference numerals beginning with a '6' in FIG. 6 and/or elements having corresponding reference numerals beginning with a '7' in FIG. 7 unless context dictates otherwise.

It will be appreciated that, for the sake of simplicity, FIG. 8 shows only a single state delta generator 808, a single updater 814, and a single batch state delta generator 820, however in practice multiple instances of one or more of these components may be used.

The state delta generator 808, the updater 814, and the batch state delta generator 820 may be instantiated within the machine learning model platform 414 previously described with reference to FIG. 4.

A batch state delta generator 820 acts as an additional state delta generator, running as an independent process for some period of time, processing a different set of events (e.g. batch events), that also sends state deltas 822 to the updater 814 to integrate into the database state. This could run concurrently to the 'live' generator 808, and so allow batch events to be processed at the same time as live events.

The database 804 serves both the live state delta generator 808 and the batch state delta generator 820, providing each with the state data 812 when requested.

The updaters 814 may be sized to process state delta updates 810, 822 both from the live event state delta generators 808 (that act on incoming event data) and batch generators 820 without significant updater lag.

The batch generator 820 may operate on a snapshot of the database state when the batch starts, or read state from the database as it goes. Because batch events could process faster than real-time, the state liveness within the batch generators should be considered.

By using a separate set of batch processes, concurrent processing can be done. These batch processes may either run all the time, or may be created just for the duration of the batch, in either case such batch processes can read batch events and send batch state delta updates 822 for onward processing by one or more updaters 814.

As described previously with reference to FIG. 7, when the updaters 814 update the state in the database 804, the state data for the entity is written to the database 804 with an incremented generation id, and the updater 814 then issues a clear command 819 to the cache 818 which clears all entries in the cache 818 for that partition-entity with a lower generation id.

It will be appreciated that exemplary embodiments may provide an arrangement in which copies of state deltas with pending updates are held in a separate cache. This may advantageously offset the 'state liveness' problem associated with state delta-based processing, as the state data can be supplied alongside copies of any applicable state deltas stored in a cache when a request to read the state data is received, or the state data may be updated using the applicable state deltas prior to its supply to the entity that requested it.

While specific exemplary embodiments have been described in detail, it will be appreciated by those skilled in the art that the embodiments described in detail are not limiting on the scope of the claimed invention.

It will be appreciated that the optional features described hereinabove in respect of embodiments of any aspect of the invention apply equally, where technically appropriate, to the other aspects of the invention.

Where technically appropriate, embodiments of the invention may be combined. Embodiments are described herein as comprising certain features/elements. The disclosure also extends to separate embodiments consisting or consisting essentially of said features/elements.

The method or methods in accordance with any embodiments of any aspects of the invention may be computer-implemented.

The aspects of the invention described hereinabove each extend to a non-transitory computer-readable medium comprising instructions that, when executed by a processor, cause the processor to carry out the method of such aspects of the invention.

The aspects of the invention described hereinabove each further extend to a computer software product comprising instructions that, when executed by a processor, cause the processor to carry out the method of such aspects of the invention.

Technical references such as patents and applications are incorporated herein by reference.

Any embodiments specifically and explicitly recited herein may form the basis of a disclaimer either alone or in combination with one or more further embodiments.

The invention claimed is:

1. A machine learning system for processing incoming event data associated with a transaction, the system comprising:

a first memory store comprising a database configured to store state data, a state delta generator, an updater, and a second memory store comprising a cache; wherein the state delta generator is configured to:

receive incoming event data and retrieve a version of the state data from the database of the first memory store, process the incoming event data and the retrieved version of the state data from the database of the first memory store using a respective model to generate a respective event state delta comprising a set of pending updates to the state data, and store the respective event state delta in a queue;

wherein the cache of the second memory store is configured to store a copy of the respective event state delta that is in the queue together with a value indicative of the version of the state data used to generate the respective event state delta;

wherein the updater is configured to:

retrieve the respective event state delta from the queue and retrieve the version of the state data to which the respective event state delta relates from the database of the first memory store, apply the set of pending updates from the respective event state delta to the retrieved version of the state data to generate an updated version of the state data, and update the database of the first memory store with the updated version of the state data;

wherein the machine learning system is configured such that:

upon receipt of a request to read a given version of the state data stored in the database of the first memory store, the system queries the cache of the second memory store to determine whether there is any event state delta that should be applied to the given version of the state data, and upon determining the presence of an event state delta in the cache of the second memory store that should be applied to the given version of the state data, the system supplies the respective event state delta from the cache of the second memory store alongside the version of the state data from the database of the first memory store.

2. The machine learning system of claim 1, configured such that copies of event state deltas having a value indicative of a version of the state data older than that of the state data being updated in the database of the first memory store are removed from the cache of the second memory store after the updated state data is written to the database of the first memory store.

3. The machine learning system of claim 1, configured for use in real-time anomaly detection, particularly in a transaction processing system.

4. The machine learning system of claim 1, wherein the incoming event data comprises transaction data or is derived from transaction data.

5. The machine learning system of claim 4, wherein the transaction data comprises electronic data associated with one or more transactions, each transaction respectively comprising a series of communications between different electronic systems to implement a payment or exchange.

6. The machine learning system of claim 1, comprising:

a plurality of state delta generators, each configured to receive incoming event data and retrieve a version of the state data from the database of the first memory store, process the incoming event data and the retrieved version of the state data from the database of the first memory store using a respective model to generate a respective event state delta comprising a set of pending updates to the state data, and store the respective event state delta in the queue, wherein the cache of the second memory store is configured to store a copy of each of the respective event state deltas generated by each of the plurality of state delta generators together with a value indicative of the version of the state data used to generate the respective event state delta.

7. The machine learning system of claim 1, wherein the respective model applied by the state delta generator comprises at least one of: a machine learning model and an adaptive ruleset.

8. The machine learning system of claim 1, wherein the updater is further configured to:

receive from the database of the first memory store one or more batch state deltas comprising a set of pending batch updates to the state data; and apply the pending batch updates from each respective batch state delta to the state data that each batch state delta relates when generating the updated version of the state data.

9. The machine learning system of claim 1, further comprising a batch state delta generator configured to:

generate a respective batch state delta comprising a set of pending batch updates to the state data; and store the batch state delta in the queue;

wherein the cache of the second memory store is further configured to store a copy of the batch state delta that are in the queue together with a value indicative of the version of the state data to which said batch state delta is applicable.

10. The machine learning system of claim 9, configured such that:

upon receipt of a request to read a given version of the state data stored in the database of the first memory store, the system queries the cache of the second memory store to determine whether there are any batch state deltas that should be applied to said given version of the state data.

11. The machine learning system of claim 10, configured such that:

upon determining the presence of batch state deltas in the cache of the second memory store that should be applied to the given version of the state data, the system supplies the batch state deltas from the cache of the second memory store so determined alongside the given version of the state data.

12. The machine learning system of claim 1, comprising: a plurality of updaters, each configured to:

retrieve a plurality of event state deltas from the queue and retrieve the versions of state data to which each respective event state delta of the plurality of event state deltas relates from the database of the first memory store;

apply sets of pending updates from each respective event state delta of the plurality of event state deltas to each respective related version of the state data to generate a plurality of updated versions of the state data; and update the database of the first memory store with the plurality of updated versions of the one or more state data.

13. The machine learning system of claim 1, wherein the state data from the database of the first memory store is indexed by an identifier.

14. The machine learning system of claim 1, wherein the cache of the second memory store is random access.

15. The machine learning system of claim 1, comprising an event application programming interface (API) through which event data is received, optionally wherein the event API comprises the state delta generator.

16. The machine learning system of claim 1, further comprising:

a state delta combiner configured to combine at least two state deltas from the database of the first memory store prior to the updated version of the state data being generated.

17. The machine learning system of claim 1, wherein the state delta generator is configured to use a plurality of models when processing the incoming event data from the database of the first memory store, wherein the use of each model generates a respective plurality of state deltas, each state delta comprising a set of pending updates to the state data, wherein each state delta is stored in the queue, and wherein the cache of the second memory store is configured to store a copy of each state delta of the plurality of state deltas.

18. A machine learning system for processing incoming event data associated with a transaction, the system comprising:

a database configured to store state data;

a processing arrangement configured to receive incoming event data, retrieve a version of the state data from the database, and use a model to generate one or more event state deltas with pending updates to the state data based on the version of the state data and incoming event data;

a cache configured to store a copy of each of the event state deltas with pending updates to the state data, each of said copies of event state deltas being stored in the cache together with a value indicative of the version of the state data used to generate the respective event state delta; and an updater configured to retrieve the respective event state delta from the cache, retrieve the version of the state data to which the respective event state delta relates from the database, apply the set of pending updates from the respective event state delta to the retrieved version of the state delta to generate an updated version of the state data, and update the database with the updated version of the state data;

wherein the system is configured such that:

upon receipt of a request to read a given version of the state data stored in the database, the system queries the cache to determine whether there are any event state deltas that should be applied to the given version of the state delta;

upon determining the presence of event state deltas that should be applied to the given version of the state data, the system supplies the respective event state deltas from the cache alongside the given version of the state data.

19. A machine learning method of processing incoming event data associated with a transaction and responding to a read request for a given version of state data associated with the transaction, the method comprising:

storing state data in a database of a first memory store;

generating a state delta comprising:

receiving incoming event data and retrieving a version of the state data from the database of the first memory store, processing the incoming event data and the retrieved version of the state data from the database of the first memory store using a respective model to generate a respective event state delta comprising a set of pending updates to the state data, storing the event state delta in a queue, and storing a copy of the respective event state delta in a cache of a second memory store together with a value indicative of the version of the state data used to generate the respective event state delta;

updating the state data in the database of the first memory store, comprising:

retrieving the respective event state delta from the queue and retrieving the version of the state data to which the respective event state delta relates from the database of the first memory store, applying the set of pending updates from the respective event state delta to the retrieved version of the state data to generate an updated version of the state data; and updating the database of the first memory store with the updated version of the state data; and responsive to receiving a request to read a given version of the state data stored in the database of the first memory store, querying the cache of the second memory store to determine whether there is any event state delta that should be applied to the given version of the state data, determining the presence of an event state delta in the cache of the second memory store that should be applied to the given version of the state data, and supplying the respective event state delta from the cache of the second memory store alongside the version of the state data from the database of the first memory store.

20. The machine learning method of claim 19, further comprising:

removing copies of event state deltas from the cache of the second memory store having a value indicative of a version of the state data older than that of the state data being updated in the database of the first memory store after the updated state data is written to the database of the first memory store.

21. The machine learning method of claim 19, wherein the incoming event data comprises transaction data or is derived from transaction data.

22. The machine learning method of claim 21, wherein the transaction data comprises electronic data associated with one or more transactions, each transaction respectively comprising a series of communications between different electronic systems to implement a payment or exchange.

23. The machine learning method of claim 19, wherein the model applied by the state delta generator comprises at least one of a machine learning model or an adaptive ruleset.

24. The machine learning method of claim 19, wherein updating the state data in the database further comprises:

receiving one or more batch state deltas comprising a set of pending batch updates to the state data; and applying the pending batch updates from each batch state delta to the state data that each respective batch state delta relates when generating the updated version of the state data.

25. The machine learning method of claim 19, wherein generating a state delta further comprises:

generating a respective batch state delta comprising a set of pending batch updates to the state;

storing the batch state delta in the queue; and storing, in the cache of the second memory store, a copy of the batch state delta together with a value indicative of the version of the state data to which the batch state delta is applicable.

26. The machine learning method of claim 25, wherein querying the cache of the second memory store to determine whether there is any event state delta that should be applied to the given version of the state data comprises determining whether there are any batch state deltas applicable to the given version of the state data.

27. The machine learning method of claim 26, wherein determining the presence of an event state delta in the cache that should be applied to the given version of the state data comprises determining the presence of batch state deltas in the cache of the second memory store; and wherein supplying the respective event state delta from the cache of the second memory store alongside the version of the state data from the database of the first memory store comprises supplying the batch state deltas from the cache of the second memory store alongside the given version of the state data from the database of the first memory store.

28. The machine learning method of claim 26, further comprising:

combining at least two state deltas from the database of the first memory store prior to generating the updated version of the state data.

29. The machine learning method of claim 19, wherein the step of generating a state delta comprises:

using a plurality of models when processing the incoming event data from the database of the first memory store, wherein the use of each model generates a respective one of a plurality of state deltas, each state delta comprising a set of pending updates to the state data;

storing each state delta in the queue; and storing a copy of the or each state delta in the cache of the second memory store.

30. A non-transitory computer-readable medium or a computer software product comprising instructions that, when executed by a processor, cause the processor to carry out the method of claim 19.

* * * * *